(12) United States Patent
Alderman et al.

(10) Patent No.: US 10,196,036 B2
(45) Date of Patent: Feb. 5, 2019

(54) MOBILE ALERT AND SECURITY SYSTEM

(71) Applicants: Lukus Sampson Alderman, LaFollette, TN (US); Lauren Thomas Alderman, Hockley, TX (US); David P Alderman, London, KY (US)

(72) Inventors: Lukus Sampson Alderman, LaFollette, TN (US); Lauren Thomas Alderman, Hockley, TX (US); David P Alderman, London, KY (US)

(73) Assignee: Child Adult Pet Safety LLC, Hockley, TX (US)

( * ) Notice: Subject to any disclaimer, the term of this patent is extended or adjusted under 35 U.S.C. 154(b) by 0 days.

(21) Appl. No.: 15/860,936

(22) Filed: Jan. 3, 2018

(65) Prior Publication Data

US 2018/0126950 A1     May 10, 2018

Related U.S. Application Data

(63) Continuation-in-part of application No. 14/828,762, filed on Aug. 18, 2015, now Pat. No. 9,870,706.
(Continued)

(51) Int. Cl.
| | |
|---|---|
| *G08G 1/123* | (2006.01) |
| *B60R 25/102* | (2013.01) |
| *B60R 25/24* | (2013.01) |
| *B60N 2/00* | (2006.01) |
| *B60J 1/17* | (2006.01) |

(Continued)

(52) U.S. Cl.
CPC .............. *B60R 25/102* (2013.01); *B60J 1/17* (2013.01); *B60N 2/002* (2013.01); *B60Q 5/005* (2013.01); *B60R 16/037* (2013.01); *B60R 25/24* (2013.01); *B60R 25/31* (2013.01); *B60R 25/33* (2013.01); *G01S 19/17* (2013.01); *G08B 21/22* (2013.01); *G08B 21/24* (2013.01); *H04L 67/30* (2013.01); *H04W 4/40* (2018.02); *H04W 4/90* (2018.02); *B60R 2025/1016* (2013.01);
(Continued)

(58) Field of Classification Search
None
See application file for complete search history.

(56) References Cited

U.S. PATENT DOCUMENTS

| | | | |
|---|---|---|---|
| 8,044,782 B2* | 10/2011 | Saban | B60N 2/002 340/438 |
| 9,378,641 B2* | 6/2016 | Beumler | B60N 2/28 |
| 2013/0194089 A1* | 8/2013 | Estrada | G08B 21/22 340/457.1 |

* cited by examiner

*Primary Examiner* — Adolf Dsouza
(74) *Attorney, Agent, or Firm* — Donald R. Boys; Central Coast Patent Agency LLC

(57) ABSTRACT

A safety alert system for a specific vehicle includes an Internet-connected server executing software, a digital data repository, a profile associated with the specific vehicle and identifying the specific vehicle and comprising contact information for a person, a computerized monitoring apparatus located in the specific vehicle with a two-way Internet connection to the Internet-connected server, global positioning system (GPS) circuitry coupled, a plurality of sensors, sensing both environmental conditions and status of apparatus of the specific vehicle, and reporting to the monitoring apparatus, and at least one set of variable values stored in the digital data repository indicating an alert status. The server keeps a log of reported variable values for the specific vehicle, periodically compares the variable values reported with the at least one set of variable values indicating an alert status, and issues an alert accordingly.

19 Claims, 12 Drawing Sheets

Related U.S. Application Data

(60) Provisional application No. 62/048,969, filed on Sep. 11, 2014.

(51) Int. Cl.
    *B60R 16/037*    (2006.01)
    *B60Q 5/00*    (2006.01)
    *H04L 29/08*    (2006.01)
    *B60R 25/33*    (2013.01)
    *G01S 19/17*    (2010.01)
    *B60R 25/31*    (2013.01)
    *G08B 21/22*    (2006.01)
    *G08B 21/24*    (2006.01)
    *H04W 4/90*    (2018.01)
    *H04W 4/40*    (2018.01)
    *B60R 25/10*    (2013.01)
    *H04W 4/02*    (2018.01)

(52) U.S. Cl.
    CPC ... *B60R 2325/106* (2013.01); *B60R 2325/205* (2013.01); *H04L 67/12* (2013.01); *H04W 4/02* (2013.01)

MOBILE ALERT AND SECURITY SYSTEM

CROSS-REFERENCE TO RELATED DOCUMENTS

The present application is a continuation-in-part (CIP) to a patent application Ser. No. 14/828,762, filed Aug. 18, 2015, that claims priority to Provisional Patent Application Ser. No. 62/048,969 filed on Sep. 11, 2014. All disclosure of the parent applications is incorporated herein at least by reference.

BACKGROUND OF THE INVENTION

1. Field of the Invention

The present invention is in the field of safety alert systems and pertains particularly to methods and apparatus for providing proactive safety, optional security, and emergency response for children and/or pets trapped in a vehicle.

2. Discussion of the State of the Art

It is quite well known that particularly pets and children, and occasionally elderly or disabled persons are sometimes left in a parked vehicle with no means for exit. Heat and/or other ambient conditions may change to form a dangerous or even fatal situation for a pet or a person. At the time of this application systems for vehicles are typically focused on theft prevention with the use of tamper alarms and accident reporting systems such as the well known On Star system for reporting accidents and the like and directing responders to the scene.

One challenge with systems as known in the art is that typically no proactive information is collected by the system and all of the system knowledge results from sensor activation, which occurs primarily after people are in the vehicle and the vehicle is turned off, while the driver of the vehicle leaves with occupants still inside the vehicle.

Therefore, what is clearly needed is a mobile alert system for vehicles that may collect data and that may use available data about an area to provide proactive security information before an owner leaves, the vehicle.

BRIEF SUMMARY OF THE INVENTION

A safety alert system for a specific vehicle is provided, comprising an Internet-connected server executing software from a non-transitory medium, a digital data repository coupled to the Internet-connected server, a profile associated with the specific vehicle and stored in the digital data repository, the profile identifying the specific vehicle and comprising contact information for a person, a computerized monitoring apparatus located in the specific vehicle, the apparatus having circuitry executing coded instructions, and a two-way Internet connection to the Internet-connected server, global positioning system (GPS) circuitry coupled to the monitoring apparatus, a plurality of sensors coupled to the monitoring apparatus, sensing both environmental conditions and status of apparatus of the specific vehicle, and reporting said conditions and status to the monitoring apparatus as variable values, and at least one set of variable values stored in the digital data repository indicating an alert status. The Internet-connected server keeps a running chronological log of reported variable values for the specific vehicle, periodically compares the variable values reported with the at least one set of variable values indicating an alert status, and issues an alert accordingly.

In one embodiment the Internet-connected server, upon finding a match of reported variable values with a set of variable values indicating an alert status, generates a message to a communication device registered to the person for whom contact information is stored. Also in one embodiment, the communication device to which the Internet connected server generates a message is a mobile smart telephone registered to the person, and the mobile smart telephone, in response to the message, executes an alert application that displays a visual alert on a display of the mobile smart telephone or generates an audible alert by a speaker of the mobile smart telephone. IN one embodiment contact information for a plurality of persons are a part of the profile, and the Internet-connected server is enabled to generate messages to communication devices registered to individual ones of the plurality of persons. And in one embodiment the profile comprises a plurality of sets of variable values, each indicating a different alert status.

In one embodiment the alert application displays a requirement for the person to respond to the alert, back to the Internet-connected server, within a certain time duration. In one embodiment, upon failure of the person to respond within the time duration, the Internet-connected server, executing the software, escalates to a new alert status, and generates one or more messages to alternative persons or enterprises, the messages indicating an emergency status, and providing GPS location of the vehicle. In one embodiment the Internet-connected server searches for contact information for persons or enterprises in a pre-programmed radius of the GPS location of the vehicle, and generates emergency messages to one or more of the persons or enterprises, providing the GPS location of the vehicle, and requesting emergency intervention. In one embodiment the safety alert system further comprises connection of the computerized monitoring apparatus to vehicle circuitry in a manner that the monitoring apparatus is enabled to initiate and manage operation of mechanical devices of the vehicle, and wherein, upon an alert being issued, signals are provided by the by the Internet-connected server to the monitoring apparatus, initiating operation of one or more of the mechanical devices. And in one embodiment the monitoring apparatus, in response to signals from the Internet-connected server, opens one or more windows of the vehicle to a pre-programmed degree.

In one embodiment the monitoring apparatus, in response to signals from the Internet-connected server, causes a horn of the vehicle to operate in a pre-programmed pattern. Also in one embodiment, the monitoring apparats, in response to signals from the Internet-connected server, unlocks one or more doors of the vehicle. Also in one embodiment the plurality of sensors includes one or more sensors providing indication of a life form in the vehicle, and wherein the Internet-connected server makes a determination of presence of a life form as a part of a process to determine alert status, and to issue alerts. In one embodiment the one or more sensors providing indication of a life form in the vehicle, comprise one or more pressure sensors in seats of the vehicle. And in one embodiment the one or more sensors providing indication of a life form in the vehicle, comprise one or more sensors monitoring concentration of one or more gases in the atmosphere in the vehicle.

In one embodiment the one or more sensors providing indication of a life form in the vehicle, comprise one or more image devices transmitting image data to the monitoring apparatus, thence to the Internet-connected server. Also in one embodiment the one or more sensors providing indication of a life form in the vehicle, are focused on a trunk region of the vehicle, and wherein, in response to determining a life form in the trunk region, the Internet-connected server unlocks and opens the trunk. In one embodiment, in response to determining a life form in the vehicle, the Internet-connected server initiates operation of a microphone and a speaker in the vehicle, enabling voice communication between the Internet-connected server and the life form in the vehicle. And in one embodiment the monitoring apparatus is focused on sensors that indicate tampering with the vehicle from outside, and the alert statuses and alerts are programmed to serve as a security system.

DETAILED DESCRIPTION OF THE INVENTION

In various embodiments described in enabling detail herein, the inventor provides a mobile safety alert system for vehicles. The inventor provides a unique system that leverages hardware and software technology in and capable of being coupled to a vehicle to provide ways that safety of especially children, pets, and some adults may be best protected relative to behavior of a responsible adult. The present invention is described in enabling detail using the following examples, which may describe more than one relevant embodiment falling within the scope of the present invention.

Figure 1:
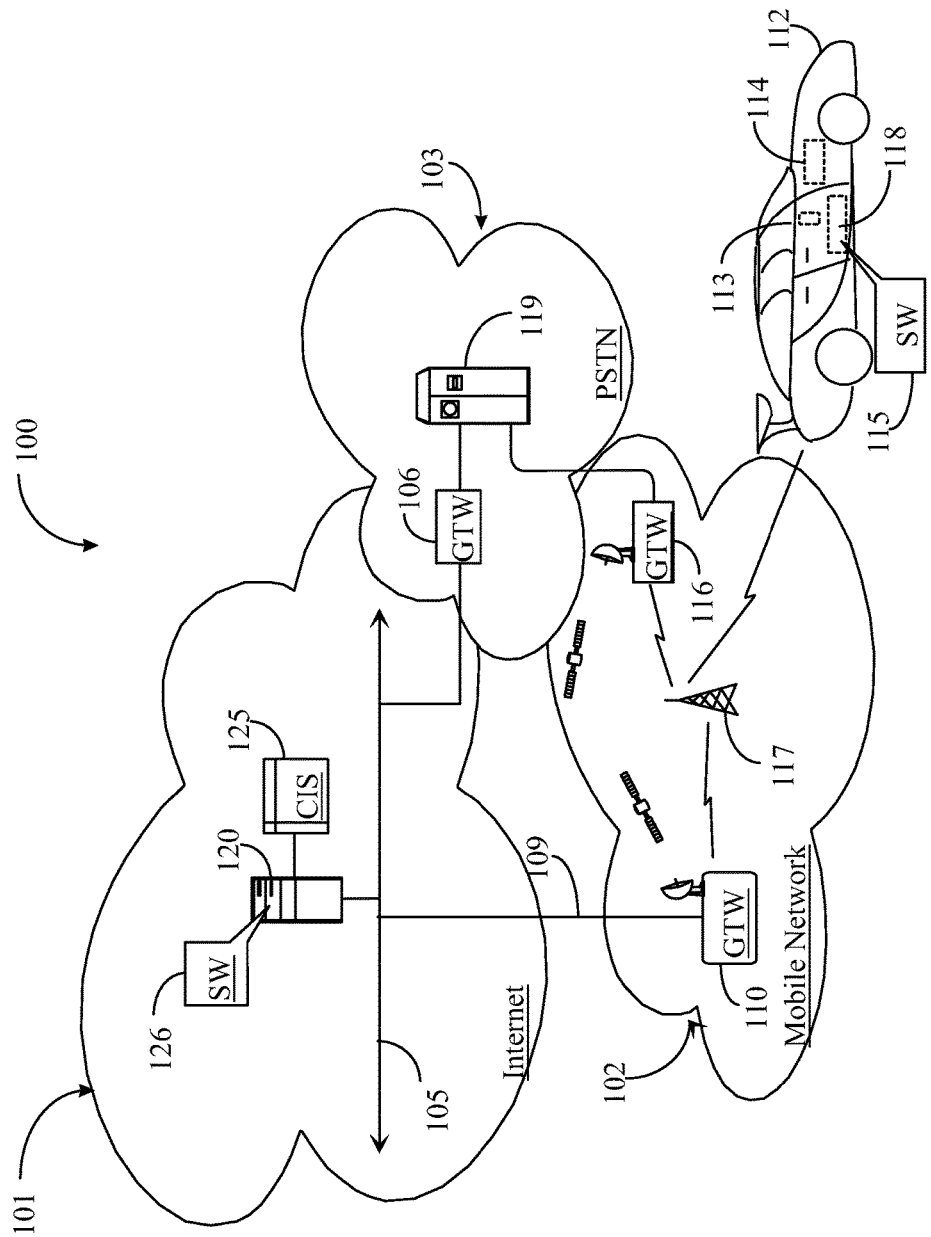
FIG. 1 is an architectural view of a communications network supporting a mobile alert system in a vehicle according to an embodiment of the present invention.

FIG. 1 is an architectural view of a communications network 100 supporting a mobile alert system in a vehicle according to an embodiment of the present invention. Communications network 100 includes a mobile cellular network 102. Mobile network 102 may be accessed by a unique mobile alert system integrated within the electrical system of a vehicle such as vehicle 112 depicted herein. Vehicle 112 is depicted including a mobile device 113 carried in the vehicle by an adult that may be responsible for the vehicle, such as the vehicle owner. Device 113 may be a cellular telephone, a personal digital assistant, a pad device, or another sort of mobile communication device. Device 113 may connect to mobile network 102 for services.

In one implementation, vehicle 112 includes an on-board diagnostic system (OBD), which typically includes a micro controller and firmware or a processor and software for enabling connection of an external diagnostic system to diagnose issues with vehicle systems, and connection for reporting vehicle status and data. An OBD system, such as system 114, includes at least one OBD connector or plug (not illustrated) enabling connection by an external system. In one implementation, the mobile alert system of the invention may connect to an OBD system such as system 114 at least for obtaining vehicle systems data. Vehicle 112 in one embodiment includes a modular unit 118, hereinafter termed mobile alert system 118. Mobile alert system 118 may include a micro controller, a rechargeable battery and a communications module such as a SIM module (not illustrated in FIG. 1). System 118 may be integrated wired or wirelessly to OBD system 114 in one implementation. System 118 may also be interconnected to the vehicle charging system, such that a rechargeable battery in system 118 may be charged during vehicle operation. Mobile alert system 118 is also referred to as CAPS system by the inventor, the acronym CAPS standing for Children Adult and Pet Safety.

Alert system 118 in one embodiment hosts a software application (SW) 115. SW 115 may execute when system 118 is powered on, and may receive and process data from any sensors that may be connected thereto. Alert system 118 may include or may have electronic or wireless connection to one or more sensors (not illustrated) for detecting presence of a child, pet or a possibly compromised adult by processing a single or a combination of sensor readings in one implementation of the invention. A compromised adult refers in this specification at least to an adult that may be elderly, disabled, a patient, or otherwise unable, without assistance, to exit a vehicle.

SW 118 includes data processing and state determination capabilities, state referring at least to the state of the vehicle relative to internal temperature, internal atmosphere composition, and whether or not there are lifeforms in the vehicle such as a child or children, one or more pets, or one or more compromised adults. Communication components of system 118 (not detailed in FIG. 1) are capable of connecting to mobile network 102 and sending at least text messages over the network to one or more than one known (pre-programmed) destination number.

Mobile network 102 includes apparatus such as a tower 117 and/or satellites for carrying wireless communications, and supports roaming for mobile coverage. Mobile network 102 may be a third-generation or fourth-generation (3G, 4G) network. Network 102 may include a gateway 110 connected to an Internet network 101 through a network backbone 105. Backbone 105 represents all the lines, equipment and access points that make up the Internet network as a whole, including connected sub-networks. Mobile network 102 includes a gateway 116 having connection to a telephony switch 119 located in the well known publicly-switched telephone network (PSTN) 103. PSTN 103 also has connection to Internet 101 via a gateway 106.

Internet backbone 105 supports an Internet server 120 hosted by a service provider that may forward alerts over communications network 100 to known destination numbers. The forwarding service works in concert with mobile system 118 to forward any alerts sent thereto to a client that is the responsible authority over the vehicle, such as a vehicle owner, for example. The forwarding service is enabled by SW 126 executing on server 120. SW 126 also may include an ability to parse alert messages, manage database entries (registered alerts), and to make contact with various third parties such as police, fire, medical, and other potential first responders that might respond to an emergency that has stemmed from a non-response to an alert notification. Server 120 includes a data repository 125, which may be a customer information system (CIS) in one implementation, documenting clients who are registered for alert forwarding services.

SW 126 may include a web page suitable for fixed and mobile Internet-capable devices operating browsers, that may enable users who have a mobile alert system in their vehicle to become clients of the service and register for services. Registration information may be stored in repository 125 and may include client information and additional family information of the client (other vehicle drivers, kids, pets, etc.). Registration information may include vehicle information such as make, model, year, color, and general condition for use in emergency contact if required. Registration information also includes in one embodiment a unique mobile alert system identification number so that a specific vehicle system may be directly associated with a client. Registration may also require the client to provide at least one alert notification phone number so that a destination number is available at server 120 to forward alerts. In one implementation, a client may furnish more than one number in a perhaps prioritized notification list, including a cellular telephone number.

Mobile alert system 118 may draw power in one embodiment from a charged lithium ion battery when vehicle 112 is not running. When vehicle 112 is running, the system may typically be in sleep mode, among other possible modes of operation, and charging back to a fully charged state. Mobile alert system 118 may operate solely on the battery for a period of time for as much, in one embodiment, as 24 hours. Opening the vehicle and starting the engine may function to put system 118 into a sleep mode or a low-power mode while the car is being driven. In one implementation, mobile alert system 118 may be connected to, and may periodically receive data from any of the on-board vehicle systems covered by the CPU of OBD 114. In one implementation, mobile alert system 118 is modular and may be dismounted and unplugged from a vehicle's electrical charging system. In this implementation, the system might be charged externally and remounted and plugged into the vehicle, or in some instances reprogrammed and applied to a different vehicle.

In general use of the invention, mobile alert system 118 may become active when a client has parked and turned off vehicle 112. Activation may be automatic on the engine being turned off, or may require manual activation in some cases. The mobile alert system may initialize one or more coupled sensors to collectively gather information from inside the vehicle such as temperature, atmospheric conditions including the presence of carbon dioxide ($CO_2$), and the presence of one or more lifeforms inside the vehicle. Certain combinations of sensor results may be preprogrammed to equate to a hazardous or dangerous state, at which time an alert may be generated describing the current state in the vehicle, and the alert, such as a pre-programmed text message, may be sent to server 120 on Internet backbone 105 through gateway 110. The inventor prefers sending text messages over communications network 100 due to light (digital content) and more reliable arrival over the network than heavier forms of media. However, in robust network areas heavier media such as live voice telephony might be employed for certain types of alert where emergency action may be required.

The communication module in system 118 in one embodiment generates and sends a text message (Alert) to server 120 when sensors coupled to the mobile alert system have reported data for an active period that at least in combination shows, upon analysis of SW 115, that a critical or dangerous state is occurring for lifeforms within vehicle 112. In one implementation system 118 may also push a message or signal wirelessly to such as an electronic remotely-operable keypad having a battery and a wireless receiver associated with the vehicle for remote operation.

Server 120 with the aid of SW 126 receives an alert, for example from system 118 in vehicle 112. SW 126 instructs a server look-up of specific information in the alert message, such as the unique ID number of the system, the list of sensors involved, and an alert type and/or level. An alert is based on intelligence from the system as gathered from the sensors that a child, pet, or an adult that may be disabled or elderly has been left in the vehicle or, in some cases, of children or an elderly or compromised adult has somehow entered the vehicle without attendance from a responsible adult (client of server 120), in most cases the vehicle owner.

When server 120 receives an alert, in one embodiment it creates an alert entry in a database such as in connected repository 125. The alert entry may include but is not limited to descriptive vehicle information and license number information, mobile alert system ID number, client name, and perhaps names of other persons closely associated with the vehicle such as other drivers in a family, etc. The alert entry may contain a list of the active sensors and their last readings. In one implementation, the alert entry may also contain an alert level such as low danger, medium danger, or high danger.

Server 120 aided by SW 126 may forward the received alert to a person responsible for the vehicle. The server may look up a destination number in routing based on the ID number of the reporting CAPS system. Once the number of the responsible adult is found the message may be sent from server 120 to a client operating the communications device hosting the number, such as device 113. In this case device 113 may be in the possession of the client who, according to sensor analysis has left the vehicle. Server 120 records time and may initiate a time-window starting on "send" and expiring after a set period. The receiving client must respond within the allotted time period to prevent escalation of the alert state into an emergency state. In one implementation, the timed period is approximately 30 seconds but may be more or less depending upon circumstances of the alert.

When server 120 forwards an active alert to a client it generates, in one embodiment, a random message identification code that the client must include in a response to the forwarded message. Active state for an alert means that the alert entry in the database is active and waiting for a response from the client within the given amount of time. Server 120 aided by SW 126 may deactivate an alert entry if the client responds to a forwarded alert message, and may then address the situation indicated by the sensors of the mobile alert system. The alert may be deactivated, in one implementation, if some event changes the facts on the ground before the client has responded to a forwarded alert. A state change may be reported by the system that overrides the previous alert sent by the system, such as the client has returned to the vehicle and started the engine putting the mobile alert system into a sleep or a charging mod, and causing the system to report that state to the server before going offline.

The client is generally required to respond to a forwarded alert within the predisposed time frame in order to prevent server 120 from contacting one or more than one emergency number supplied by the client or otherwise obtained by the server for the local area of the vehicle. If the client fails to respond to a forwarded alert within the time frame to respond (TTR) then the server will report the unfolding emergency. Determination of a critical situation requiring an alert is made on the mobile alert system as a result of ongoing sensor analysis.

One with skill in the art will realize that a most dangerous period is when the client is away from the vehicle. Therefore, the default operating period for the mobile alert system may be activated whenever the vehicle is turned off and the client leaves the vehicle. However, this is not a rigid limitation of the current invention. In one embodiment, the mobile alert system may detect levels of carbon monoxide while the vehicle is running or idling. In one implementation, a client may be able to activate the mobile alert system by phone in certain situations, like after a car-jacking that may have resulted in a child or pet left in the vehicle after it was commandeered. The vehicle may then be tracked using GPS tracking techniques.

Figure 2:
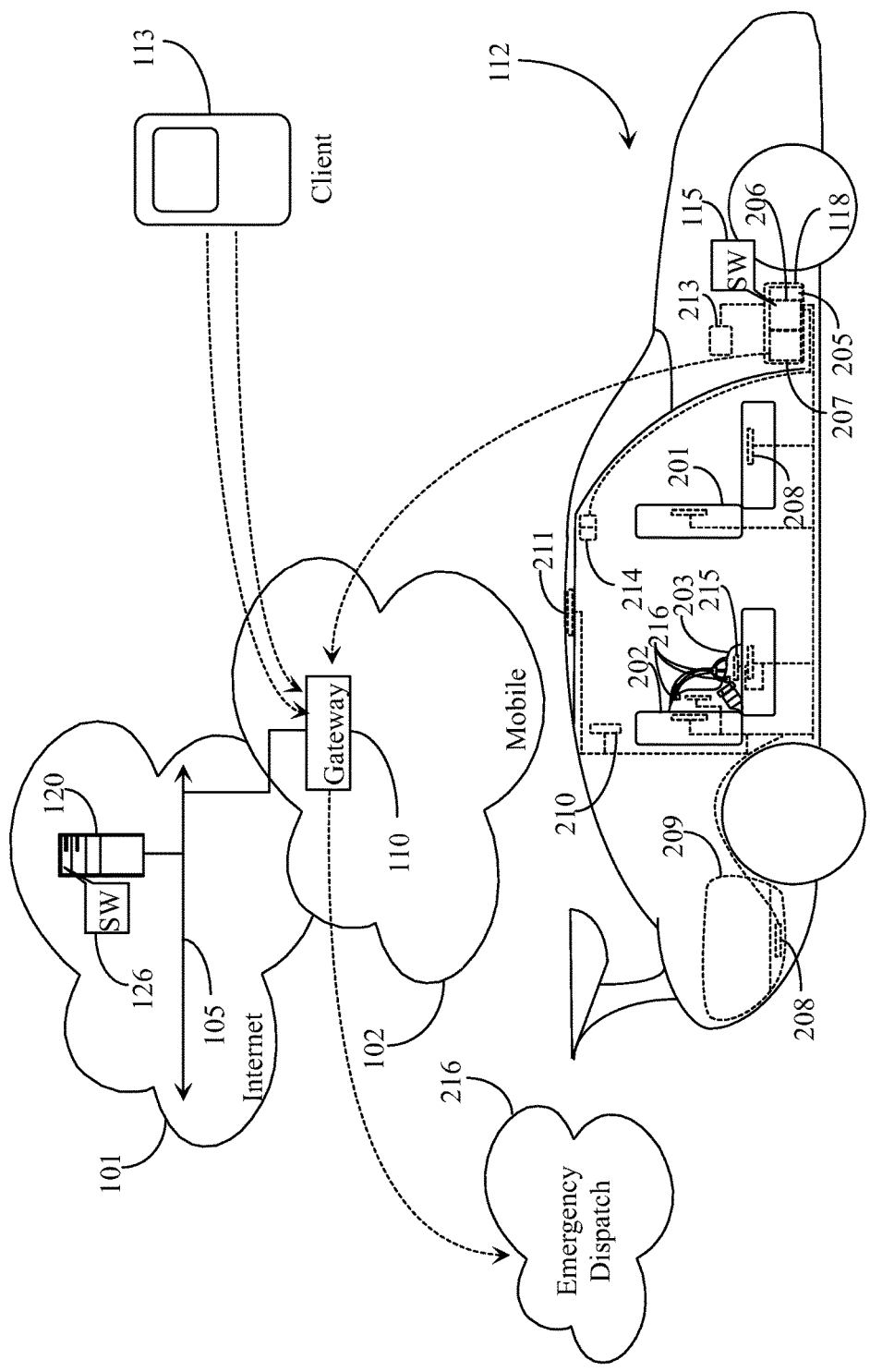
FIG. 2 is a side elevation view of the vehicle of FIG. 1 with network support and a version of the mobile alert system of FIG. 1 embedded therein.

FIG. 2 is a side elevation view of vehicle 112 of FIG. 1 with network support and a version of the mobile alert system of FIG. 1 integrated therein. Mobile alert system 118 has a rechargeable battery, such as a lithium ion battery 205. Battery 205 may have a charging connection to the vehicle charging system and may be charged fully while the vehicle is running. In this mode, the mobile alert system may or may not be used while charging. In this implementation system 118 includes a micro controller with memory that may host SW 115.

A communications module 207 in one embodiment generates alerts in the form of text messages to server 120 through mobile network 102 whenever a particular sensor data analysis uncovers a potentially critical or dangerous situation. In one implementation, communications module 207 is a SIM908 component. Communications module 207 is capable of accessing a global system for mobile communications (GSM) network with a general packet radio service (GPRS) enabling packet-based services with a continuous Internet connection. Module 207 may access the network to place a call, send a text message, and use Internet through at least a 3G network. Module 207 may be operated in a voltage range of 3.0V to 4.8V and may communicate through a serial peripheral interface (SPI) which controller 206 may provide. SIM908 module 207 also works with any SIM cards from major service providers such as AT&T™.

In one implementation, mobile alert system 118 has electronic connection to a vehicle wiring hub 213 in a fashion that integrates the unit to the vehicle charging system. Certain actions taken in the vehicle during operation may trigger on and off states, sleep or awake states, or other actions from the mobile alert system. For example, turning the vehicle on and then driving may serve to place the mobile alert system in a non-active charging mode. Parking and turning off the vehicle may place the mobile alert system in active mode.

In one implementation, capacitive sensors such as sensors 208 are provided and disposed within the cushion portion and back portion of seats 201 and 202 including the driver seat. The sensors may be a model or version of MPR121 peripheral sensors from Freescale™. An MPR121 detects presence by measuring capacitance change between the probes it provides and a detected object. Since living beings function as electrical conductors, MPR121 is fully capable of detecting human presence. The sensors work with 3.3V, consume very little power, as they only draws 29 µA on average, and lastly, communicate through I2C protocol, which controller 206 is capable of using. In this implementation, there is at least one capacitive sensor for each seat in vehicle. This implementation depicts a sensor in each seat back portion as well, although this is not required to practice the invention. Broken lines depict wired connections between the sensors and micro controller 206. In some embodiments, the sensors may communicate by a near-field wireless system or BlueTooth™

Vehicle 112 is shown with optionally a child car seat 203. Child seat 203 may be participate in practice of the invention by acting as a peripheral device that includes sensors that may be connected to micro controller 206. For example, capacitive sensors 215 may be provided in the seat and back portion of seat 203 for detecting a child in the seat. This may not be required to practice the invention, as a stock child seat with a child seated within may be detected using the sensors in the main vehicle seats provided the under portion of the child seat is conductive. In some embodiments, the child seat may have an electrical connector that may connect to a matching connector to connect the seat electrically to the mobile alert system and thereby incorporate the sensors in the child seat into the list of active sensors available to mobile alert system 118. In a further variation buckles or snap components of the straps used to secure the child into seat 203 may include sensors that report if a strap is or is not closed or connected. In still a further variation of the implementation a sensor 208 may also be added to the floor area of a vehicle trunk 209 to detect if a person or a pet is in the trunk of the car.

In one embodiment, a CO2 sensor device 211 is provided to mobile alert system 118 to monitor levels of carbon dioxide within the vehicle space to help confirm that a person or a pet is still in the vehicle during an active sensing period. The CO2 sensor type used in this implementation may be a K-30 sensor from CO2Meter™.com. Sensor 211 includes a microcontroller that may execute an algorithm for refining accuracy of the sensor output during operation so it may be operated with very low or little maintenance. Sensor 211 detects any dangerous rise in CO2 within vehicle 112, typically while it is parked or stationary. If a rise in current CO2 reaches or exceeds a predetermined threshold then it is highly likely a person or pet is inside the vehicle.

In this implementation, CO2 sensor 211 uses a non-dispersive infrared sensor to measure the CO2 in the air trapped in the vehicle interior. The sensor operates by beaming an infrared light through a chamber of inert gas toward an infrared sensor. CO2 absorbs infrared light, therefore the infrared sensor detects attenuation of the infrared light through the gas chamber to determine the concentrations of CO2 in the air within the vehicle. Sensor 211 is able to detect CO2 from 0 to about 10,000 parts per million (PPM). Sensor 211 includes both a digital output (12C) and an analog output (UART). A broken line depicts connection of sensor 211 to mobile alert system controller 206. In one implementation sensors may be widely distributed within the vehicle while in another implementation they may be wholly or partially co-located on a panel or in a special enclosure without departing from the spirit and scope of the present invention.

In this implementation, a temperature or heat sensor 210 capable of measuring ambient temperature is provided within vehicle 112 and connected to controller 206 of mobile alert system 118. In this implementation, the temperature sensor 210 is a DS18B20 temperature sensor. Other temperature sensors may be used without departing from the spirit and scope of the present invention.

Mobile alert system 118 includes in one embodiment a motion detector 214. Motion detector 214 may be a Grid-EYE™ device known to the inventors. Motion sensor 214 in this embodiment uses an 8×8 array of thermophile transducers which can detect the quantity of an infrared signal. A thermistor is available on motion detector 214 for measuring temperature but may be less accurate than temperature sensor 210. Motion detector 214 draws 3.3 V or 5V in a variation of the device. It consumes 4.5 mA when awake and only 2 mA when asleep. Motion detector 214 may be toggled from normal mode to sleep mode.

All of the sensors distributed in the vehicle may be wired to a hub device that connects to micro controller 206, or each sensor may use a dedicated line. In one implementation sensors that are adapted for wireless communications may be used and may connect to system 118 wirelessly. The use of more than a single sensor to detect the presence of a person or a pet within the vehicle provides an elevated level of accuracy with one sensor type validating or at least confirming the reading of another sensor type. For example, if a child seat capacitive sensor detects the presence of a child, elevated CO2 may confirm or at least reassure the result. SW 115 may be programmed to observe specific sensor data thresholds for capacitance, motion, and temperature where one or a combination of the data thresholds must be breached before an alert may be sent out.

Communications module 207 may in one implementation generate and send a text alert message to server 120 through gateway 110. Server 120 aided by SW 126 receives the message, validates the ID of the mobile alert system and creates an active alert entry. Server 120 starts a time window of a predetermined duration and immediately forwards the alert to an associated client (113) number, the forwarded message containing a randomly generated code that the client must include in a response to the alert. Moreover the client must respond within the predisposed time window starting from the time the alert entry is stored or at least from the time the client is forwarded the alert message.

Assuming no response from the client within the predisposed time to respond (TTR), server 120 may make contact using text, voice over Internet (VoIP), or live telephony contact to an emergency response service such as a police emergency dispatch service 216. In one implementation, an emergency response to an alert by the server may involve multiple contacts each to a different service, such as police, fire, and medical. In one implementation, a TTR is approximately 30 seconds. In one implementation, different time windows may be observed for different emergency levels. For example, if a pet is left behind in the vehicle but the temperature is not a factor, the TTR may be relaxed somewhat. It is important to note herein that temperature rise and temperature lowering may be sensed and used as criteria for an emergency.

In one implementation GPS tracking of the vehicle may provide server 120 with GPS coordinates of the vehicle and those coordinates may be mapped or otherwise used to determine at the server which emergency response locations to contact. A GPS apparatus may be a part of system 118 to provide for such service when no GPS is available in the vehicle otherwise. Such contact may include all of the pertinent information about the vehicle, knowledge of who may be in the vehicle, whether human or pet, and the location of the vehicle. In a variation to this implementation, server 120 may listen or wait for resolution of an emergency after it was reported by the server before ceasing contact attempts to emergency services or other local contact locations where help may be available. For example, if GPS indicates the vehicle is in a gas station parking lot and the client is sick in the bathroom with a child or pet in the car and an emergency is reported but the client does not respond, the server may attempt to contact the gas station attendant and inform him or her of the developing emergency situation.

Figure 3:
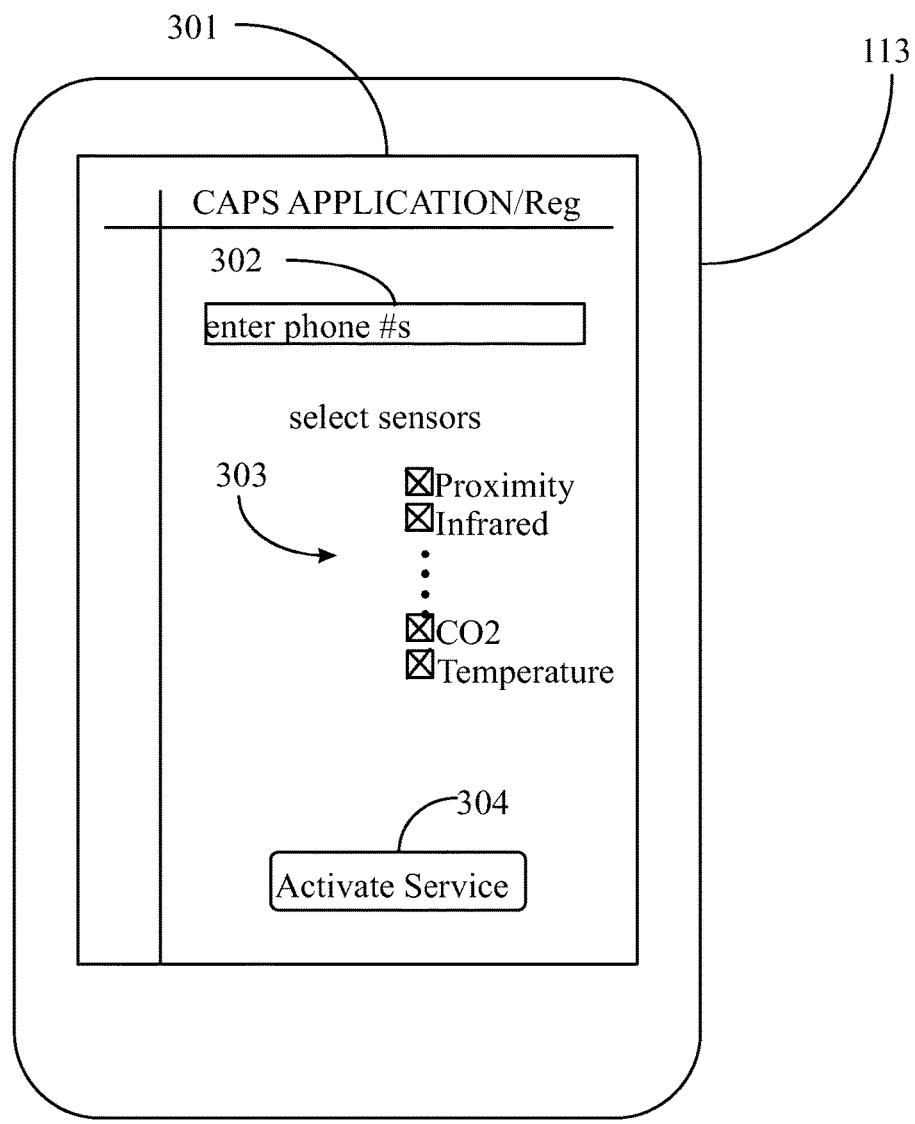
FIG. 3 a diagram of a web interface for registering the mobile alert system of FIGS. 1 and 2 with an alert management and forwarding service entity according to an embodiment of the present invention.

FIG. 3 is an elevation view of an interactive web interface 301 for registering the mobile alert system of FIGS. 1 and 2 with an alert management and forwarding service entity according to an embodiment of the present invention. The mobile alert system of the invention is integrated with a web-based forwarding service as previously discussed. A registering process may be carried out by a client using an internet-capable device such as from mobile phone 113. After providing typical registration particulars, such as name, address, email, perhaps financial information, and mobile number, interface 301 asks a client for one or more alert numbers to call if an alert is received from the system. The client may type in or otherwise insert the numbers into a text entry box 302 presented on interface 301. In one implementation, a primary alert number may be the mobile number of the primary driver of the car. If there is more than one frequent driver of the vehicle, the mobile numbers of other drivers may also be added to a list of alert numbers.

In one implementation, a client may also provide one or more emergency response numbers into field 302. Any numbers provided to the service may be validated before acceptance of the numbers. In one implementation, the service has access to a database of emergency response locations having contact numbers and location data that may be used to infer locality to an incident. In this implementation, the client is not responsible for providing any emergency contact information. GPS tracking of the vehicle by the communications module in the vehicle may provide location data with every alert the system issues.

In one implementation, a client may determine or at least configure priorities and inclusion of the sensors that will be used to detect presence of a child, pet, or compromised adult in the vehicle. In one implementation, the sensors are stock, and activated for use by default wherein the client may not tamper with them. In one implementation, a mobile alert system sensor array may require calibration and some testing before becoming active in a first period of operation. In this implementation interface 301 presents a checklist of sensors including a proximity (capacitive sensor), Infrared sensor (motion), CO2 sensor, and temperature sensor. All of these may be checked by default. There may be additional sensors added to the configuration of sensors without departing from the spirit and scope of the present invention. In one implementation, sound may be detected with a microphone.

In the same or in another implementation, video may be recorded. However, in a preferred implementation, only low-power-consuming sensors are deployed to maximize battery life for other operations like communications. Once a client has selected sensors from list 301, he or she may select an activation option 302 to activate the service for the registered mobile alert system. A reset button on the hardware case of the mobile alert system may require activation to synchronize changes made to configuration settings with the database of server 120.

Figure 4:
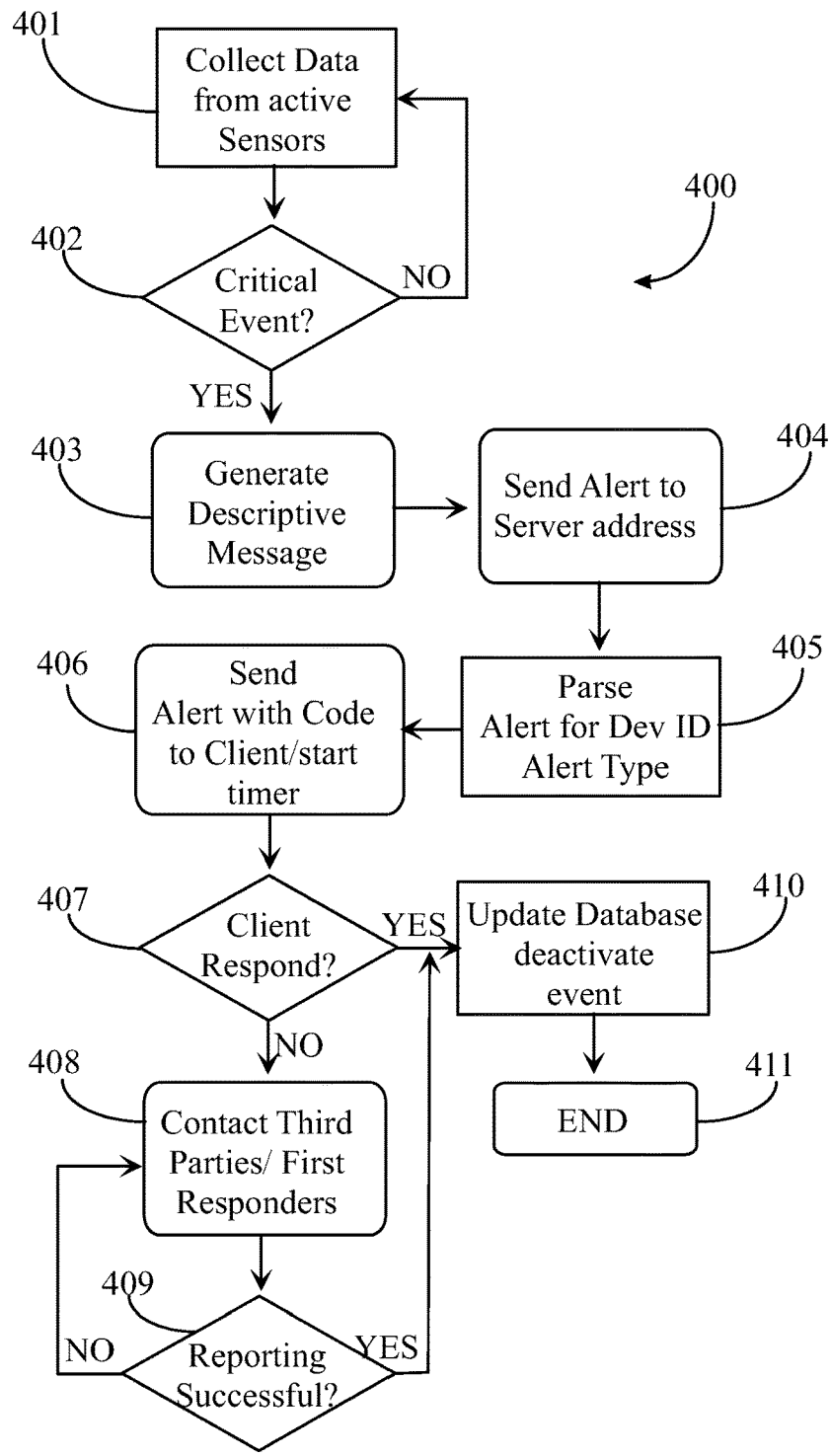
FIG. 4 is a process flow chart depicting general steps for managing an alert triggered by system sensors of the mobile alert system of FIGS. 1 and 2.

FIG. 4 is a process flow chart 400 depicting general steps for managing an alert triggered by system sensors of the mobile alert system of FIGS. 1 and 2. At step 401 the mobile alert system such as system 118 of FIG. 1 collects data from one or more peripheral sensors. In one implementation, the system automatically boots whenever the client stops the host vehicle and turns off the engine. At step 402, the mobile alert system, aided by SW, makes a determination whether or not the collected data indicates an alert situation, which may be generally defined as a critical situation. The system may parse and analyze the sensor data in periodic operations. Sensor data that is benign may be immediately purged from the system in one implementation.

If at step 402 the mobile alert system determines that there is no critical situation the process may loop back to step 401 until a situation may be identified. If the mobile alert system determines at step 402 that a critical situation has been identified, the communications module of the mobile alert system generates a text message alert addressed to an Internet server that may forward the alert to a responsible client associated with the system host vehicle. The message may include at least the identification number of the mobile alert system, and identification of the sensors and readings that preceded the alert. In one implementation, every alert message carries identical weight from the perspective of the Internet forwarding service. More particularly every received alert results automatically in a forwarded alert notification to the associated client number or numbers in case of more than one client.

At step 404 the mobile alert system sends the generated message to the server. The server parses the message for the device ID number at step 405 and looks it up in a database. In one implementation, the server may parse out an alert level from two or more alert type or level possibilities. However, this is not required to practice the invention. At step 406, the server creates an alert entry in the database and forwards the alert message as a notification text alert to at least one client-provided telephone number. Also in step 406 the server may include a randomly generated code inserted into or otherwise associated with the message that is returned to the server in any reply to the notification alert. The server may also timestamp the alert entry and start a time period quantifying a time to respond (TTR) to the forwarded alert notification in step 406.

At step 407 the server determines whether or not there has been a response to the forwarded alert notification from the associated client or clients that were targets of alert forwarding. If the server determines that a response was received from the associated client within the TTR set for the database entry at step 407, the server may update the database and deactivate the alert entry at step 410. In this case the process may end at step 411. The alert entry may not be deleted, however, for a purpose of record keeping, such as maintaining a log of the activity that may be made available to clients of the service. If the server determines at step 407 that no response was received, meaning that the TTR expired for the alert entry, the process moves to step 408 where the server may contact third-party entities such as a first responder unit or organization and report the unfolding emergency.

In one implementation, the server may determine at step 409 whether an initial reporting of an emergency was successfully registered and that responders are headed to the scene. For example, making one report at one responder organization and reporting to others as well may be accomplished until it is recognized that the issue is resolved or at least under management by first responders. If the server determines that the reporting of the unfolding emergency was successful at step 409, the process may resolve to step 410 where the entry may be deactivated and may end at step 411 for that particular interaction.

Figure 5:
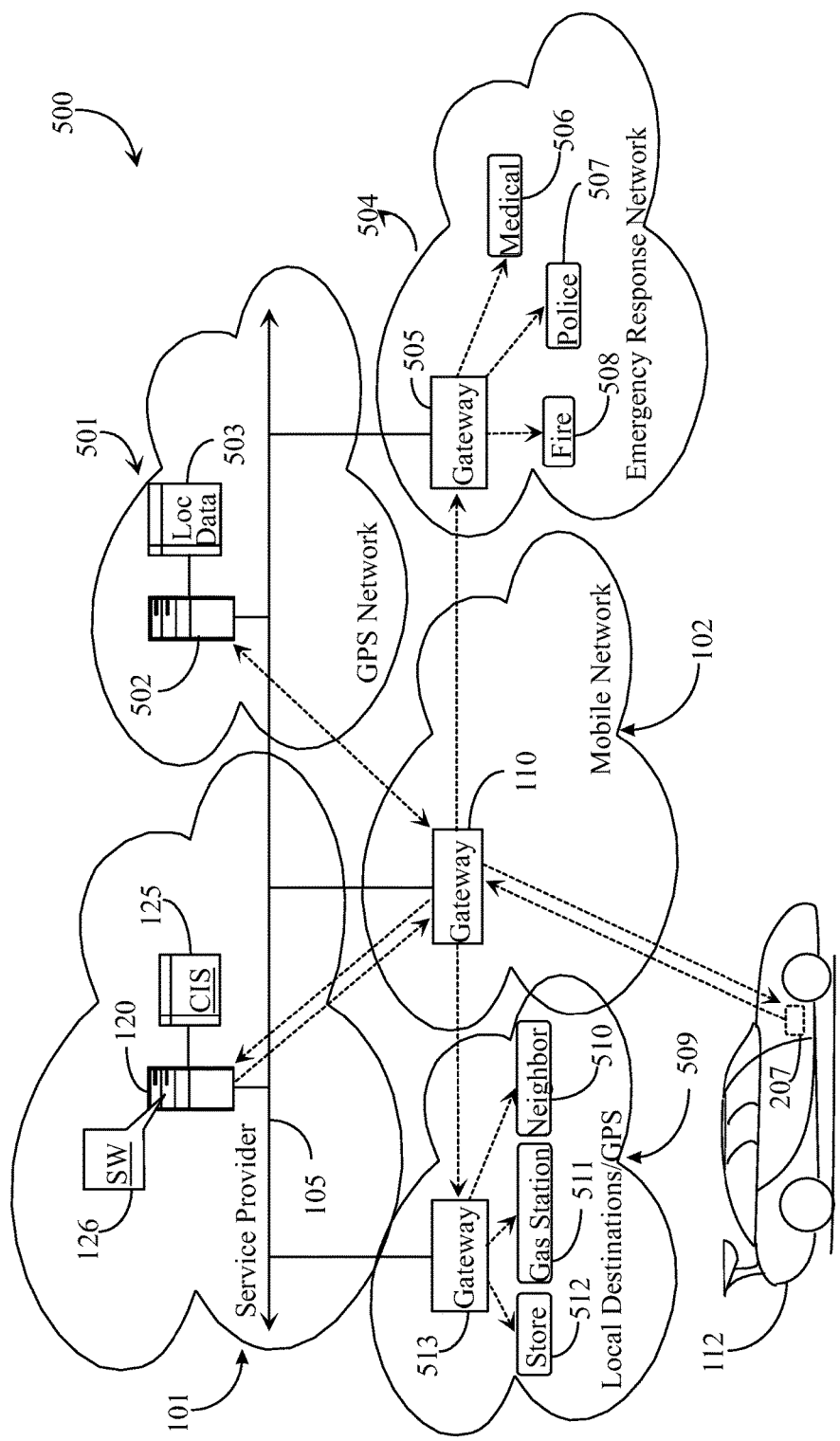
FIG. 5 is an architectural overview of a communications network over which an alert progressing to an emergency may be managed according to an embodiment of the present invention.

FIG. 5 is an architectural overview of a communications network 500 over which an alert progressing to an emergency is managed according to an embodiment of the present invention. Network 500 includes Internet 101 and mobile network 102. Vehicle 112 includes communications module 207 capable of bi-directional communication with server 120 through gateway 110. This is illustrated also by broken arrows indicating communication in both directions.

Communications module 207 may also include a GPS receiver, and may subscribe to GPS tracking service offered through a GPS service provider, such as a GPS server 502 having connection to a data repository 503 containing GPS location data in a GPS network 501. GPS network simply refers to a computer access point (server 502) that receives GPS data results directly or indirectly through another computing device from one or more of the known GPS satellites. A bi-directional broken arrow illustrates communication between communications module 207 of the mobile alert system of FIG. 1 and server 502 through gateway 110.

Server 120 with the aid of SW 126 may obtain the GPS location of vehicle 112 at such time that an alert is received from communications module 207. When the mobile alert system is booted or otherwise made active from sleep mode, it may record its current GPS location coordinates and include the data in any alert message sent to server 120. In this way, should an alert escalate into an emergency that must be managed, the server has exact coordinates of vehicle 112.

The communications network includes an emergency response network 504. Emergency response network 504 includes a gateway 505 to Internet backbone 105 and to mobile network 110. In case of an alert with an expired TTR, server 120 may make telephony contact via a telephony application and dialer (not illustrated) but assumed present as components of SW 126 to one or more entities in emergency response network 504 such as fire 508, police 507, and medical 506 emergency services. The GPS location of vehicle 112 may, in one implementation, aid SW 126 in looking up appropriate emergency numbers closest to the last GPS location of the vehicle. In this example, server 120 may contact any one, a combination of or all of emergency response entities fire 508, police 507, and medical service 506 through gateway 110 as illustrated by the directional arrow from gateway 110 to gateway 505. In another example communications may go through gateway 505.

In one implementation communication may be bi-directional between emergency services and server 120 through a telephony application with interactive voice or touch-tone capabilities or via live operators or dispatch personnel. In this implementation server 120 may obtain response data from emergency response network 504 relative to success of reporting and resolution of the issue. Server 120 may add such information to an alert entry that is otherwise deactivated but retained for records.

In one implementation, GPS data of vehicle 112 may help server 120 to look up contact numbers of local destinations at the same or very near the vehicle. A local network 509 generally represents communications destination points very close or near the same GPS coordinates as the vehicle. Network 509 has a local gateway 513 and includes a store 512, a gas station 511, and a neighbor 510. In this implementation server 120 may, if local services are not near enough for a quick response or for some other reason deemed appropriate, make telephony contact with local numbers of businesses or neighbors that are known to be at or near the GPS location of the vehicle. In one example, if a client has left a pet in vehicle 112 and is shopping in store 512, but left his mobile in the vehicle, server 120 may make contact with a telephone number of the store after GPS data shows vehicle in the store parking lot. In another example, a child might have gotten into vehicle 112 sometime after it was parked and may be locked inside. GPS data indicating the vehicle is at the client home may prompt the server to contact one or all of the immediate neighbors of the client to attempt to report the unfolding emergency.

In the above described implementation, contacting local destinations near to the GPS location of vehicle 112 may be an option when professional services are far off, in bad weather situations, if a professional service did not respond or was not available, etc. GPS tracking of vehicle 112 is not required to practice the present invention but may add significant advantage in time saved to locate the vehicle after an emergency situation has developed. In one implementation, where emergency numbers are determined on the fly based on GPS, an algorithm for prioritizing a list of numbers to attempt to dial may be provided where the closest number relative to the GPS location of vehicle 112 is dialed first and then the next closest number, etc. Other criteria may also be observed in prioritizing emergency numbers such as professional services or volunteer services. In one embodiment server 120 may send text messages to local emergency entities in place of telephone calls.

Figure 6:
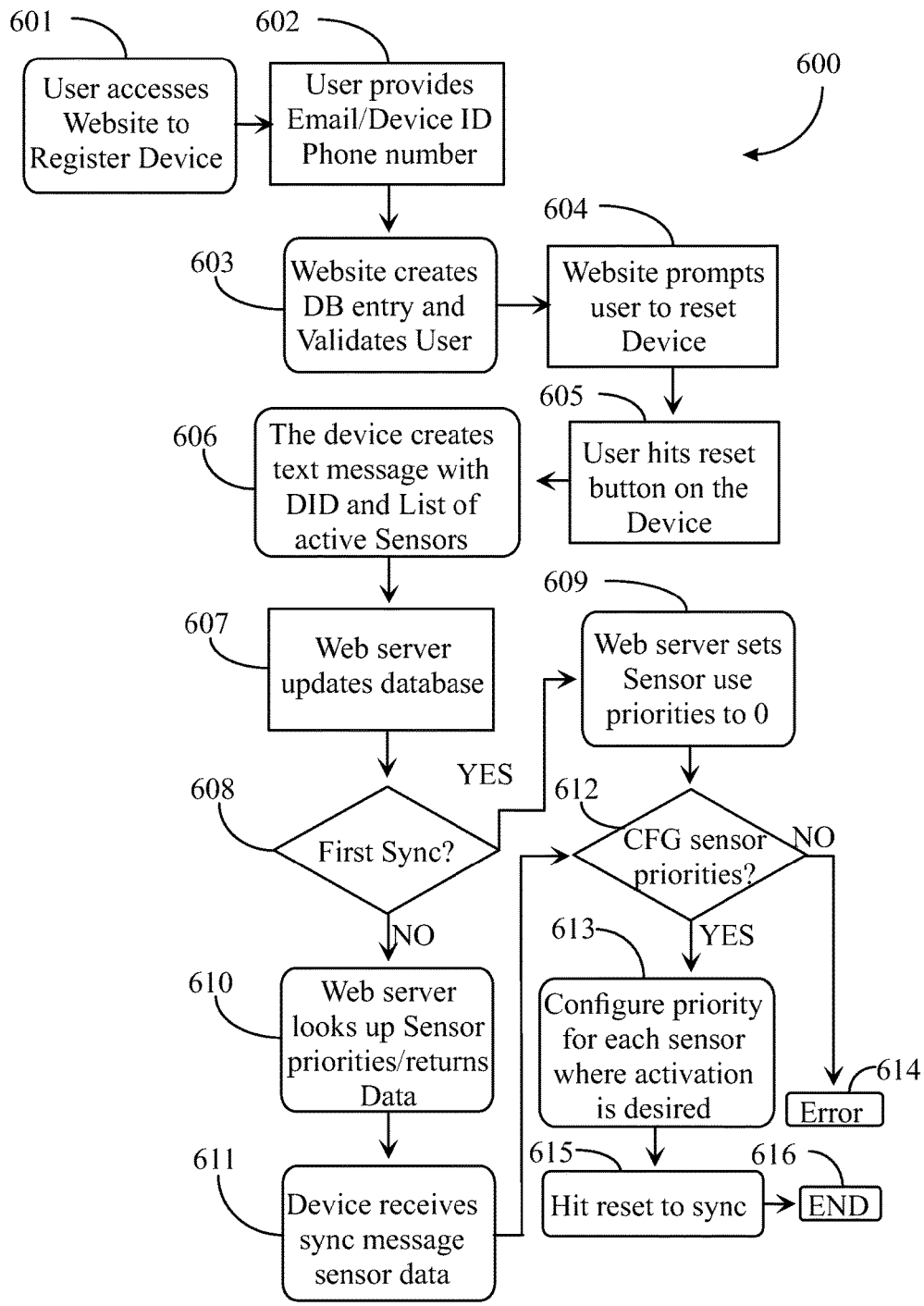
FIG. 6 is a process flow chart depicting more granular steps for registering the mobile alert system and prioritizing sensor devices according to an embodiment of the invention.

FIG. 6 is a process flow chart 600 depicting more granular steps for registering the mobile alert system and prioritizing sensor devices according to an embodiment of the invention. At step 601 a user (client) accesses a website to register a mobile alert system installed in the client vehicle. At step 602 the user may provide, in addition to name and other pertinent information, a valid email address, a device ID, and a telephone number into the appropriate text entry fields to notify in a case of emergency. At step 603, the website may validate the user and create a database entry for the user to store data relative to the user.

The server may validate a user in step 603 by responding to a given email address to make sure it is the client's address, texting to the number given thereby validating the mobile number of the client, and by checking the device ID against a database containing the ID number of sold units. A list of sensors may also be entered into the database in accordance with the device ID. Server 120 prompts the user via web interface to reset his or her device at step 605 to synchronize all of the data at the server and on the mobile alert system.

At step 605, the user now a client may activate a reset button on the mobile alert system to sync the data at both locations. The mobile alert system generates a text message containing the device identification (DID) number and at least a list of active sensors at step 606. At step 607 server 120 receives the text message and updates the database. At step 608 the server aided by SW 126 (FIG. 1) may determine whether or not the database entry is a first data sync for the client. If at step 608 the system determines that is a first sync the sensor priorities are set to 0 in anticipation of the client configuring priorities of the sensors in the list of sensors. At step 612 the client may determine whether or not to configure sensor priorities. If the client does not determine to configure sensor priorities at step 612 the process may skip to stem 614 where an error message may be sent to the client.

If the client determines to configure sensor priorities at step 612 the priority for each sensor may be configured in step 613. In one implementation, the server provides a default list of sensors and priorities and the client may review and make changes. In one implementation, the client may not select or configure sensors used in the mobile alert system. In this exemplary process, the client may hit the reset button on the mobile alert system to sync the data with the server at step 615. The process may end at step 615.

At step 608, if the server determines it is not a first data sync, then the server may look up the current list of active sensors and their configured priorities and returns the data to the mobile alert system. At step 611 the mobile alert system communications module or device receives the data from the server. The process may resolve again to step 612. If the client decides to change current priorities relative to the list of active sensors on the device the client will be required to reset the device to sync the data with the web server.

Figure 7:
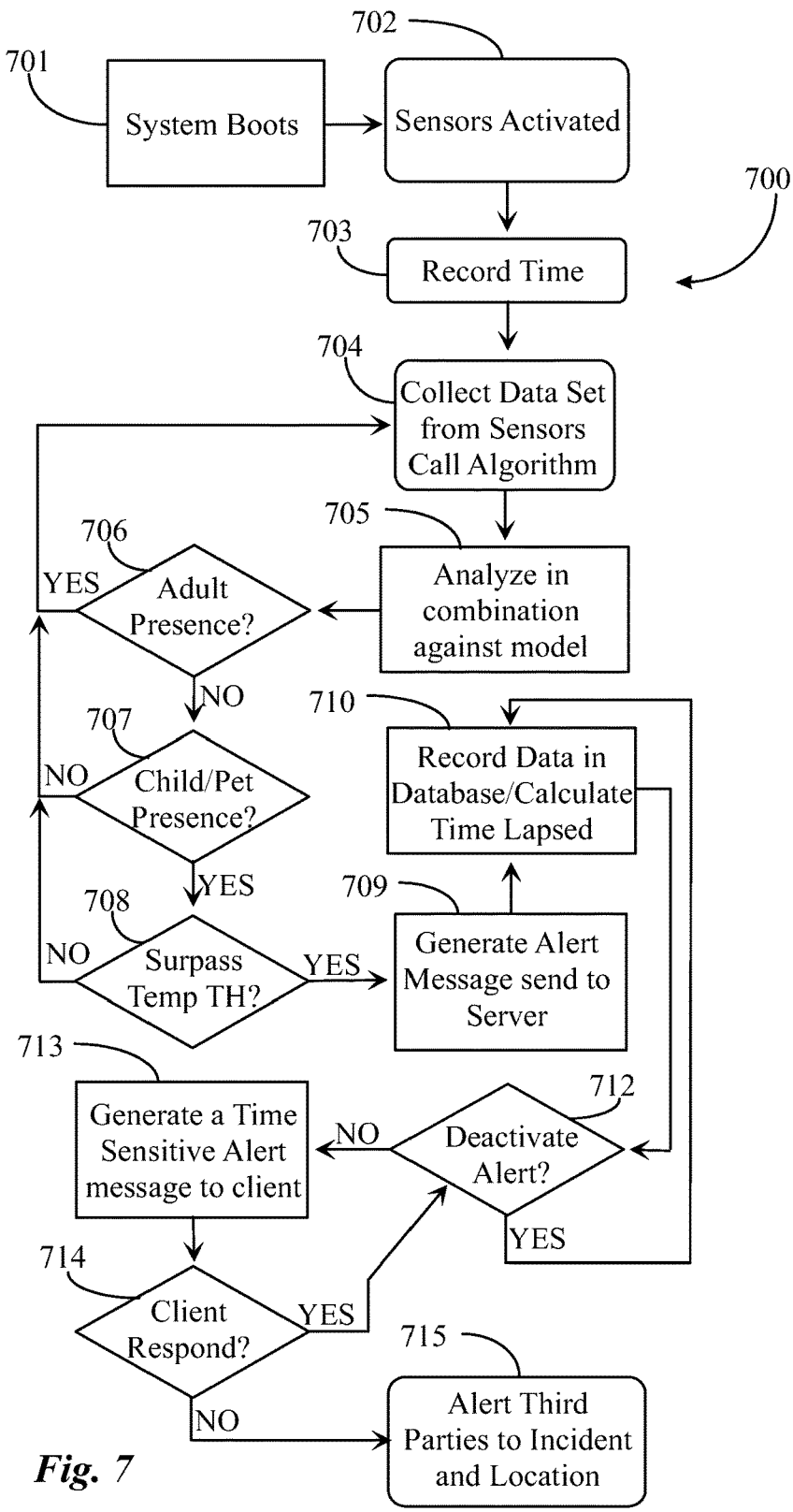
FIG. 7 is a process flow chart depicting steps for determining an alert state from collected sensor data and for managing the alert to resolution.

FIG. 7 is a process flow chart 700 depicting steps for determining an alert state from collected sensor data and for managing the alert to resolution. At step 701 the mobile alert system boots up. The mobile alert system may be manually booted or it may boot automatically based on a triggered action. In one implementation, the mobile alert system may boot or wake up from a sleep mode when the client parks the vehicle and turns off the engine. This may be when the system is most useful.

The battery life of the mobile alert system may power the system with the engine off for up to 24 hours in one embodiment before the battery is depleted. In one implementation, the system may be programmed to stay on for a specified period of time shorter than the estimated battery life after the engine in the vehicle is turned off. It might be critical to detect presence in the vehicle during a specified period of time after the vehicle is turned off and the client leaves the vehicle. It is also possible that a child may get into the vehicle after it is left parked and the sensing time has expired, such as when the child is playing. Therefore, in one implementation after a specified sensing period expires, the system may go back into sleep mode or low power mode with sensors deactivated. The mobile alert system may be programmed to wake up if a door of the vehicle or the trunk lid of the vehicle is opened any time after the alert system has gone to sleep.

In one implementation, the mobile alert system automatically boots in step 701 when a client turns off the engine of the vehicle. The sensors connected to the system may be activated at step 702. In one implementation, the mobile alert system records the exact time that the system was booted and the sensors were activated at step 703. The amount of time that expires when a child or pet is left in a vehicle in hot weather is critical from the point of view of rescuing the child. The activated sensors may begin collecting data from inside the vehicle at step 704 and one or more algorithms may be called or executed in step 704 in order to analyze sensor data at step 705. At step 705 the sensor data may be analyzed in combination (of sensors) and results may be compared against certain data thresholds that when breached trigger an alert.

At step 706 the mobile alert system may determine whether or not an adult is present in the vehicle. In this example adult refers to the client. If the client is present in the vehicle the process may loop back to step 704 for collecting more sensor data. If the mobile alert system determines there no adult in the vehicle (client has left vehicle) the system may determine whether or not a child or pet is still in the vehicle at step 707. If the mobile alert system has not detected a presence of a child or pet in the vehicle at step 707, the process may resolve back to step 704 where more sensor data is collected for analysis. If the mobile alert system determines that there is a pet or child left in the vehicle at step 707, the process may move to step 708.

At step 708 when there is a child or pet detected in the vehicle the system may determine if a temperature threshold of the ambient temperature within the vehicle has breached a preset temperature threshold. If the mobile alert system determines no breech of a temperature threshold at step 708, the process may move back to step 704 for collecting more sensor data. A temperature threshold may be predetermined for hot weather and established as a triggering point for an alert. Moreover, a temperature threshold may also be predetermined for cold weather. The threshold point should not be a temperature that might cause critical events in the vehicle.

If the mobile alert system has determined that a temperature threshold has been breached at step 708 and there is a child or pet left in the vehicle as determined at step 707, the mobile alert system generates an alert message and sends the message in step 709 to an Internet server analogous to server 120 of FIG. 1. The server may record the data from the alert message received in a connected database and calculate any time lapse since the alert system recorded the time at step 703. At step 712 the server may determine whether or not to deactivate the event before notification of authorities. For example, if a client returns to the vehicle before the server makes a determination to contact emergency authorities an alert entry in the database may be deactivated.

In the event that the alert is not deactivated at step 712, the web server generates a time sensitive alert message and sends it to the client. Time sensitive refers to a window of time set by the server from the beginning of the notification of the client to the time a client responds to the communication. Such a time window might be dynamically changed by the server depending upon the data it has received and parsed. For example, the time window may be shortened considering time already elapsed since the mobile alert system began tracking the time. In one implementation, the default time between notification and client response is approximately 30 seconds.

At step 714 the system may determine whether a notified client has responded within the preset time limit or not. In one implementation, the alert notification is a text message including the nature of the alert, alert data, and list of sensors involved in determining the critical nature of the alert. The server may generate and include a random code or number that must be present in the client reply in order to verify the response was from the notified client's device. If the system determines that the client has responded within the time frame imposed for response the process may move to step 712 where the system determines whether to deactivate the event.

If the client has responded within the time limit imposed it may not guarantee the alert will be deactivated. For example, the client may respond but GPS of the client may show a far distance from the vehicle and with time being calculated the server might still alert one or more third parties of the emergency. The process may move to step 710 where the alert may be updated and deactivated. The alert entry may be archived in the database for the purpose of record keeping and later review. If the client has not responded to the notification within the allotted time frame at step 714, the server may contact third party entities and report the unfolding emergency and the exact location of the vehicle at step 715. Third parties may include emergency response professionals such as medical, fire and police services. Third parties may also include persons available at locations very near the vehicle such as a store, gas station, neighbor, etc.

Figure 8:
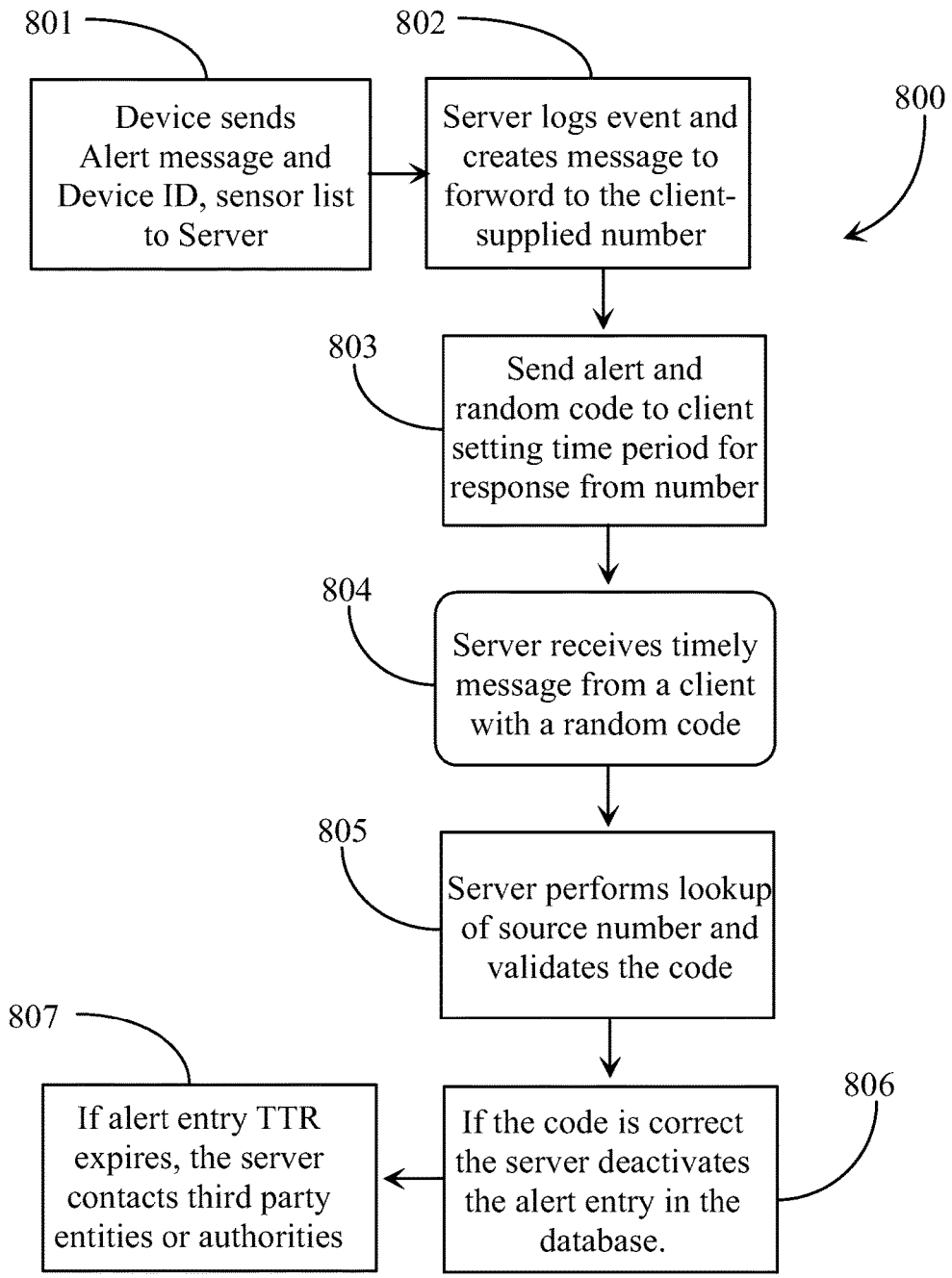
FIG. 8 is a process flow chart depicting more granular steps for handling an alert from the mobile alert system of FIGS. 1 and 2.

FIG. 8 is a process flow chart 800 depicting more granular steps for handling an alert from the mobile alert system of FIGS. 1 and 2. In this more detailed process, it is assumed that the client has responded in a timely manner to an alert message and the alert is deactivated. At step 801 the communications component of the mobile alert system sends an alert message to the server the message including at least the device or hardware ID and a list of sensors triggering the alert. A step 802, the server logs (records) the alert creating an alert entry in a database and generates a text alert or notification of an alert to a client-supplied number, which may typically be the client's communications device like a cell phone, a smart phone, an iPad, or other device supporting network communications and send and receipt of at least text-based messages. In one implementation, the server generates a fresh message to the client. In another implementation, the server appends the received text and forwards the appended version to the client.

At step 803 the server sends the alert notification message and a randomly generated code or number to the client device. In one implementation, the random code is also temporarily cached or permanently recorded in association with the client account. The server may impose a TTR on the alert notification that may be displayed in real time on the client's communications device. In this example, the server has received a timely message from the client with the generated code embedded into the message reply or otherwise associated or attached to the message. The server leverages the code in the received message to look up the client account that the code has been associated with and validates the code is from the client. If the code is correct the server may deactivate the alert entry in the database. However, in the event a TTR does expire meaning that the client either did not get the text alert or that the client just did not respond within the allotted time window, the server may contact third party entities including authorities.

In one implementation of the mobile alert system, the system may be designed to boot up whenever the car has stopped moving for a certain period of time but is still running. In this way, the sensor devices may be activated before the client steps out of the vehicle for faster detection time. As soon as the system boots and detects life within the vehicle it may raise some connected audible alarm that a client just leaving the vehicle might notice, such as a horn honking, lights flashing, or other quick audible or visual warnings that the client left a pet or child in the car. This implementation may be because of a very high ambient temperature or a very low ambient temperature occurring at the time of operation. Horn honking and flashing of emergency and headlights may also alert any passersby of the unfolding emergency.

If the temperature is 110 degrees for example, and the client leaves a pet in the car there would not be much time to rescue the animal. Therefore, there may be a special warning mode that immediately warns the client in multiple ways, such as just after the client steps out of the vehicle. For example, if the sensors detect presence of a pet or person left behind almost immediately or seconds after the client has left and is perhaps still near the vehicle, a warning may be issued to the client. In a variation of this implementation the client may have a remote activate able FOB key that may vibrate or make an unpleasant sound if the client has left a child or pet in a vehicle that is out in an extremely dangerous environment.

In one implementation, a client may access the mobile alert system directly from a cellular phone running a device access application using short range wireless communication to communicate with the system. In another implementation the mobile alert system of the invention includes a USB port that enables a client or service technician access to the hardware and software of the system. In one implementation a client may add and configure additional sensors to the system including audio, gas, visual and other types of sensors.

Some automobile OBD systems are rather sophisticated, and include computerized ability to perform certain functions on remote command. It is well-known, for example, that the On-Star™ system enables a client who has locked his or her keys in a vehicle, to call an On-Star™ operator by phone, who may then command the computerized system in the car to unlock a door of the vehicle. In one embodiment of the invention, operable with automobiles that afford remote operation of vehicle functions, the server, detecting a set of circumstances indicating an alert situation, may command functions remotely to alleviate a dangerous situation. For example, sensing a pet or a person in the vehicle, and an unsafely high temperature, the server may remotely roll down one or more windows to attempt to cool the local environment and alleviate the situation. In a situation with a pet or person in a vehicle and unsafe low temperature, the server may command a heater to help alleviate the dangerous situation. There are many other possibilities.

In one embodiment of the present invention the vehicle-based mobile alert system in conjunction with the network server may enable proactive messages to be generated based on sensor data from inside the vehicle and upon information available to the server at the time of sensor reading and analysis.

Figure 9:
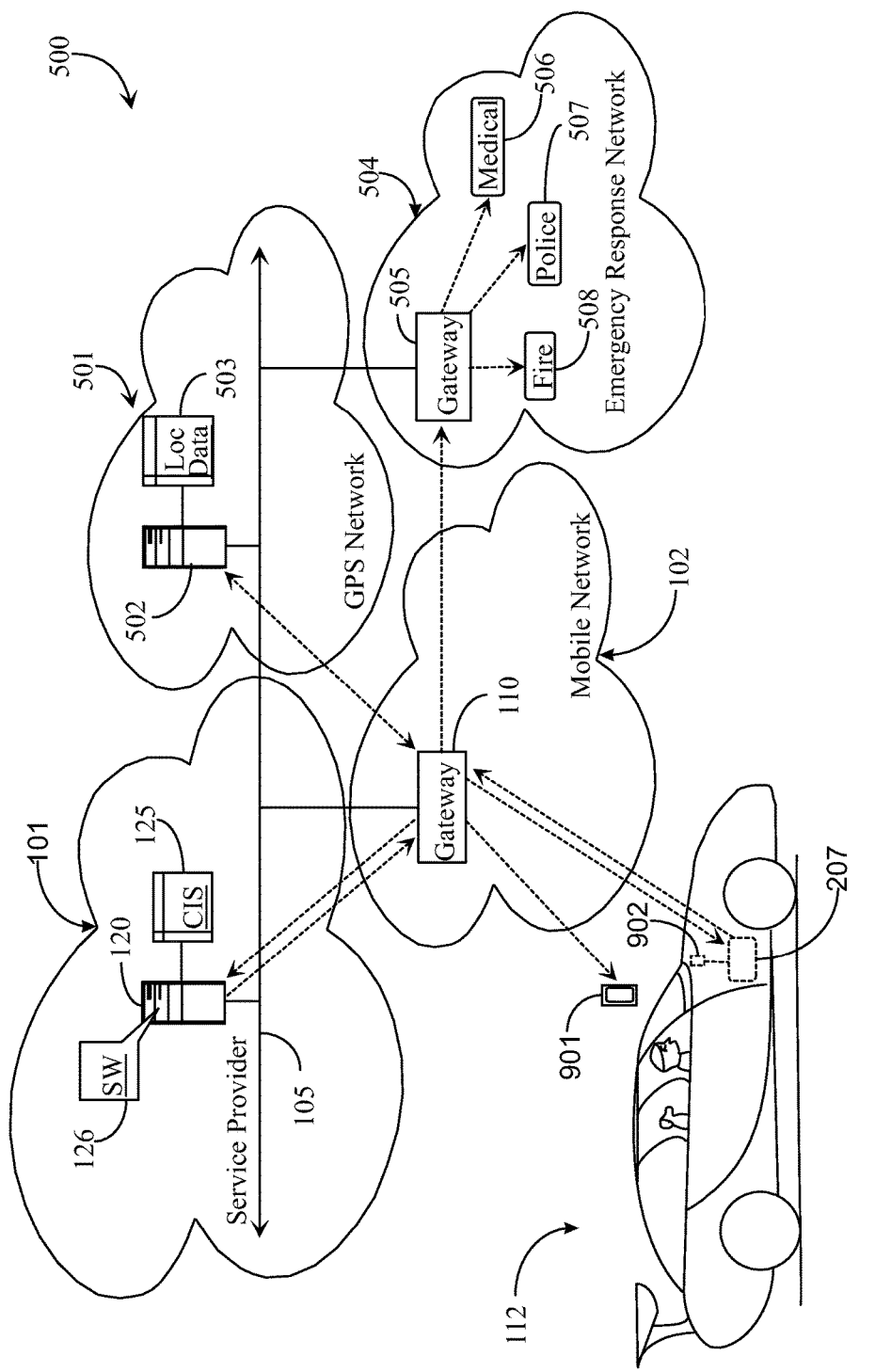
FIG. 9 is an architectural overview of a communications network over which proactive messaging relative to a potential hazardous event may be managed by a mobile alert system according to an embodiment of the present invention.

FIG. 9 is an architectural overview of the communications network 500 of FIG. 5 over which proactive messaging relative to a potential hazardous event may be managed by a mobile alert system according to an embodiment of the present invention. In this view, some elements depicted in FIG. 5 are not shown. Such elements depicted in FIG. 5 such as network 509, gateway 513 and local destinations 510, 511, and 512 may be assumed present in this embodiment.

Vehicle 112 in this embodiment has at least one occupant besides the driver of the vehicle. In this case it is a pet. It was previously described that the mobile alert system may be operated on its own battery power while the vehicle is turned off and that the approximate time of life for such operation may be 24 hours before recharging may be required. Recharging of the system unit 207 occurs in this case once the vehicle is turned on by a driver wherein the recharge state includes the system assuming a sleep mode wherein the sensors are not active due to the fact that the driver is presumably in the vehicle and therefore in control of the safety of any occupants therein. However, it may be the case that the driver or owner may re-enter vehicle 112 using an approved key unlock feature or key before unit 207 requires re-charging when all of the system sensors may still be active. The driver may also load vehicle 112 with occupants for a new trip.

In this implementation, the sensors in vehicle 112 may, as a default routine, detect the occupants during vehicle loading and before the vehicle is started by the owner. According to capability previously described, unit 207 may collect the sensor data and may analyze the data to confirm occupants in the vehicle other than the driver and may open a connection to server 120 aided by SW 126 and may sync with or otherwise send the information that the driver has just entered the vehicle and has loaded occupants therein presumably for a road trip.

In a variation to the above scenario, if the vehicle is started before loading occupants, and the sensors were active just beforehand, the sensors and unit may by default remain active in order to sense a possible loading of occupants. If the unit was in an off state just before starting the vehicle, then the unit, instead of charging in a sleep mode, may, after a small amount of charge time, boot up and activate the sensors in order to detect the possible occupants of the vehicle before the driver has pulled away from the location. In any case, there is opportunity for the mobile unit 207 to communicate the occupant information to server 120 at the beginning of a trip.

Server 120 aided by SW 126 may retrieve GPS location data for the event just communicated via GPS network 501, and GPS server 502 may then use that information to retrieve a weather and or hazard forecast for that day. The weather and or hazard data might be retrieved only in the event that unit 207 reported occupants in the vehicle other than the driver of the vehicle. In this situation, information such as temperature forecast data for the day and GPS region of the vehicle may be instantly retrieved and may be analyzed with occupant data and time data to enable server 120, aided by SW 126, to make a determination if the driver should be proactively alerted or reminded of a potential hazard occurring should an occupant be left in the vehicle at some point during the trip.

In this implementation, the driver of vehicle 112 has possession of a phone 901 and has an OnStar™ service 902 that may have a special communication link to unit 207, so that an audible message might be received at unit 207 from server 120 through gateway 110 in mobile network 102 and be played out loud inside the vehicle. Phone 901 may be capable also of receiving a call from server 120 through gateway 110 wherein once answered, an audible message may be played over the phone speakers. In one embodiment cameras may be installed within the vehicle as a means of confirming occupants present and a microphone may be available to the occupants where they may communicate information to the server and wherein the server may respond through unit 207 and an accessory audio system that may be adapted to carry such responses. In one embodiment the adapted system is a car radio and part of the adaptation is powering on of the radio and tuning to a specific channel automatically as a result of detection of a critical situation.

SW 126 may include a routine for sending a proactive alert based on data analysis. For example, if the temperature is predicted to rise to a dangerous level in the area of vehicle 112 by a certain part of the day, the driver of vehicle 112 may receive one or more messages and or audible messages through such as through phone 901 and or OnStar™ system 902 as a forewarning to the driver of the upcoming temperature increase, the message including information conveyed to the driver such as "Please do not leave any occupants in your vehicle today as it will not be safe to do so after 12 PM today". In this way, the driver of the vehicle has been made aware of the pending increase in temperature and when it will become too dangerous to leave an occupant in the car shortly after the driver is embarking on a trip.

A proactive message may be sent as a text message and an audio message or as a series of messages including both text and audio to ensure receipt. In one embodiment, the driver must confirm receipt of such a message or give acknowledgment that a message was received as a safeguard before the server will stop repeating those messages periodically. If a driver does not confirm message receipt, the server may alert first responders in network 504 that the vehicle driver might be impaired and has occupants in the vehicle.

In variations of this embodiment the third-party weather or hazard information might include other data such as flash flood warning data, tornado warning data, fire danger or active fire warning, smoke levels, etc. The routine may be run as a default routine to simply warn the driver of any pending condition that might be dangerous for any occupants left in a vehicle in an effected area or region.

In the event that a driver does not have occupants in vehicle 112 at start up, the system may go into sleep mode for charging and no messages may be generated or sent to the driver. However, should the driver stop to pick up occupants at another location, turning off the vehicle may again activate the sensors to detect the occupants and then proactive messaging might begin. In one case a vehicle might be tracked by GPS and if the vehicle pulls over and stops, but the driver has left the engine running, the fact that the driver is not moving for a time period may be a trigger for the mobile alert system to be remotely booted from sleep mode by the server to activate sensors in order to determine if one or more occupants are then present.

Figure 10:
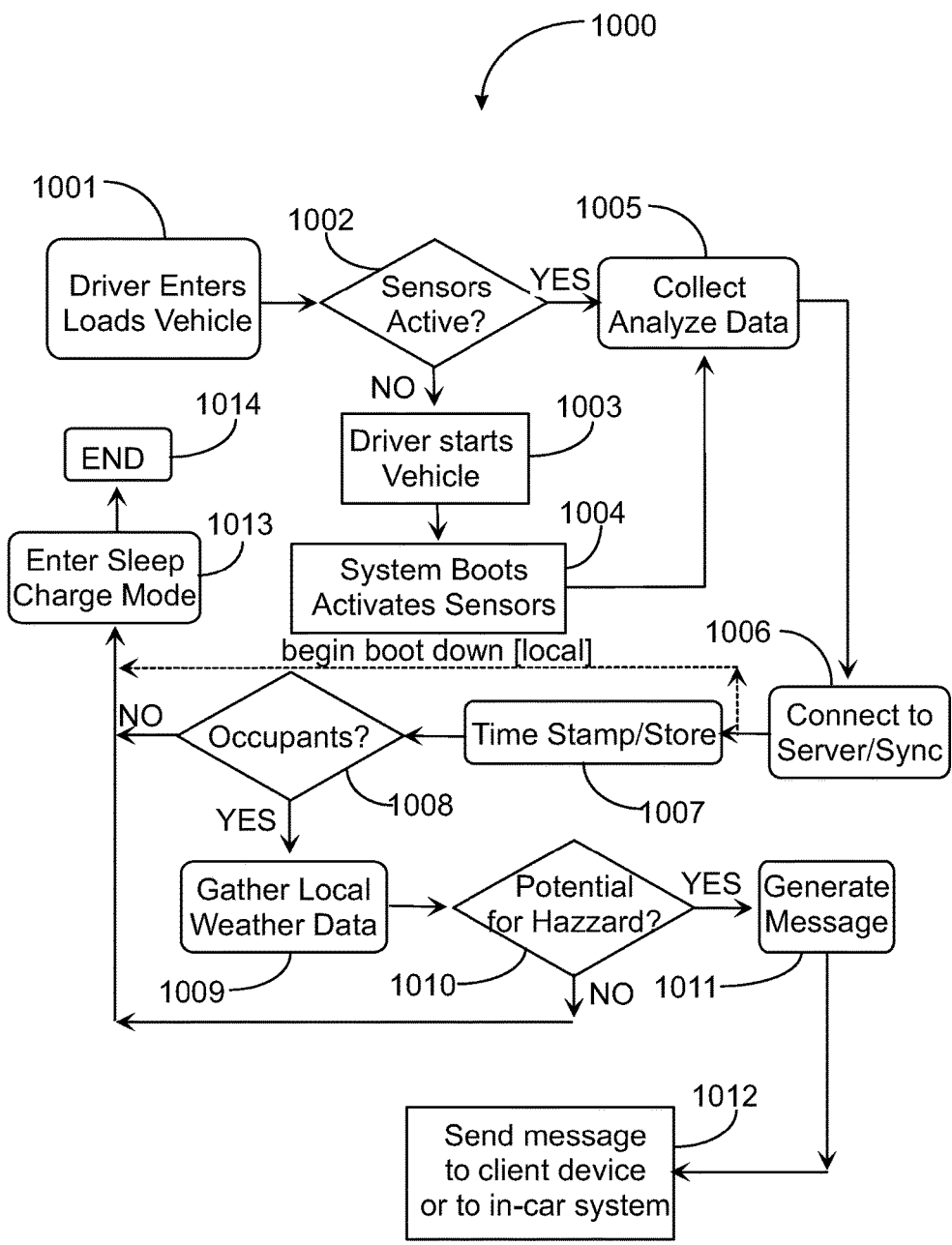
FIG. 10 is a process flow chart depicting steps for proactive alert management to a client of a mobile alert system.

FIG. 10 is a process flow chart 1000 depicting steps for proactive alert management to a client of a mobile alert system. At step 1001 a driver of a vehicle having a mobile alert system of the invention may enter and load a vehicle such as vehicle 112 of FIG. 9 with occupants or without occupants. At step 1002, it may be determined if the sensors of the mobile alert system are active. If the system is still active at step 1002, they collect data and that data is analyzed at step 1005 before the driver starts the vehicle. If the sensors are not active when the driver loads then the driver starts the vehicle at step 1003. Starting the vehicle causes the system to begin a charging sequence due to the fact that the lithium ion or other rechargeable battery of the unit may be drained (more than 24 hours running). When sufficient charge is accumulated, the system boots and activates its sensors at step 1004.

At step 1005 the sensors may then collect data and the unit may analyze that data. In one embodiment, the mobile alert unit such as unit 207 described in FIG. 9 connects to a server on a network such as to server 120 of FIG. 9 to sync or otherwise report the data and interpretation result of one or more occupants in vehicle or of no occupants in the vehicle. Once this has been received at the server, the mobile alert unit may deactivate sensors and begin boot down to charging mode weather it was active or not when the driver entered the vehicle as is depicted by a broken side path labeled begin boot down [local].

At the server location, the server may time stamp and store the received data at step 1007. The server may determine at step 1008 whether or not any occupants were detected in the vehicle. If the data received at step 1006 confirms no occupants, the process may resolve to step 1013 where the mobile alert unit is charged in sleep mode (no active sensors). If in step 1008 it is confirmed there are one or more occupants in the vehicle, then at step 1009 the server may gather or otherwise retrieve current local weather data including projections or predictive warnings of high or low temperatures that could be extreme and dangerous to occupants.

At step 1010, the local weather data and the occupant data may be compared to a model having one or more threshold values to determine if a potential hazard might exist such as an impending temperature spike or drop. If the server determines a potential hazard does not exist at step 1010, the mobile alert system may be left to charge with sensors deactivated at step 1013 and the process may end at step 1014. In this case no messaging to the client may occur. If a hazard potential is determined, the system may generate one or more messages at step 1011. A message generated may be text or audio or a combination of both.

At step 1012 the server may communicate the generated message to the driver or owner of the vehicle one time or periodically over time. The message or audio alert may be delivered to the phone device of the driver or to a peripheral communications system already installed in the vehicle such as an OnStar™ system. In either case the mobile using may be reduced to charging in sleep mode after the server has evaluated data from the unit. In one embodiment should it be determined there are no occupants locally the mobile unit may not contact the server before being reduced to charging state. In one implementation sleep mode includes a minimum ability to receive messages via the network to the unit. In another implementation the messages may be sent by the server to a client device or to an in-car system bypassing a charging mobile alert system unit.

In various embodiments of the invention, as described above, the on-line service may keep track, over time, of actual use of the subject vehicle, presence of occupants, when individual occupants are loaded into the vehicle, and when individual occupants leave the vehicle, as well as GPS location, sensor readings, such as temperature in the vehicle, state of windows, doors, and locks, and, in general, the state of all devices and environment, and of occupants of the vehicle. Every change updates a new snapshot of conditions, a snapshot being an instant state of all variables, and every snapshot initiates a threat assessment to determine if there is an unsafe condition. In event of a threat condition, coded instructions executing at the server, and in some cases in the vehicle, trigger emergency procedures, such as notifying an owner or driver of the vehicle or notifying first responders within reach of the vehicle's GPS location.

Figure 11:
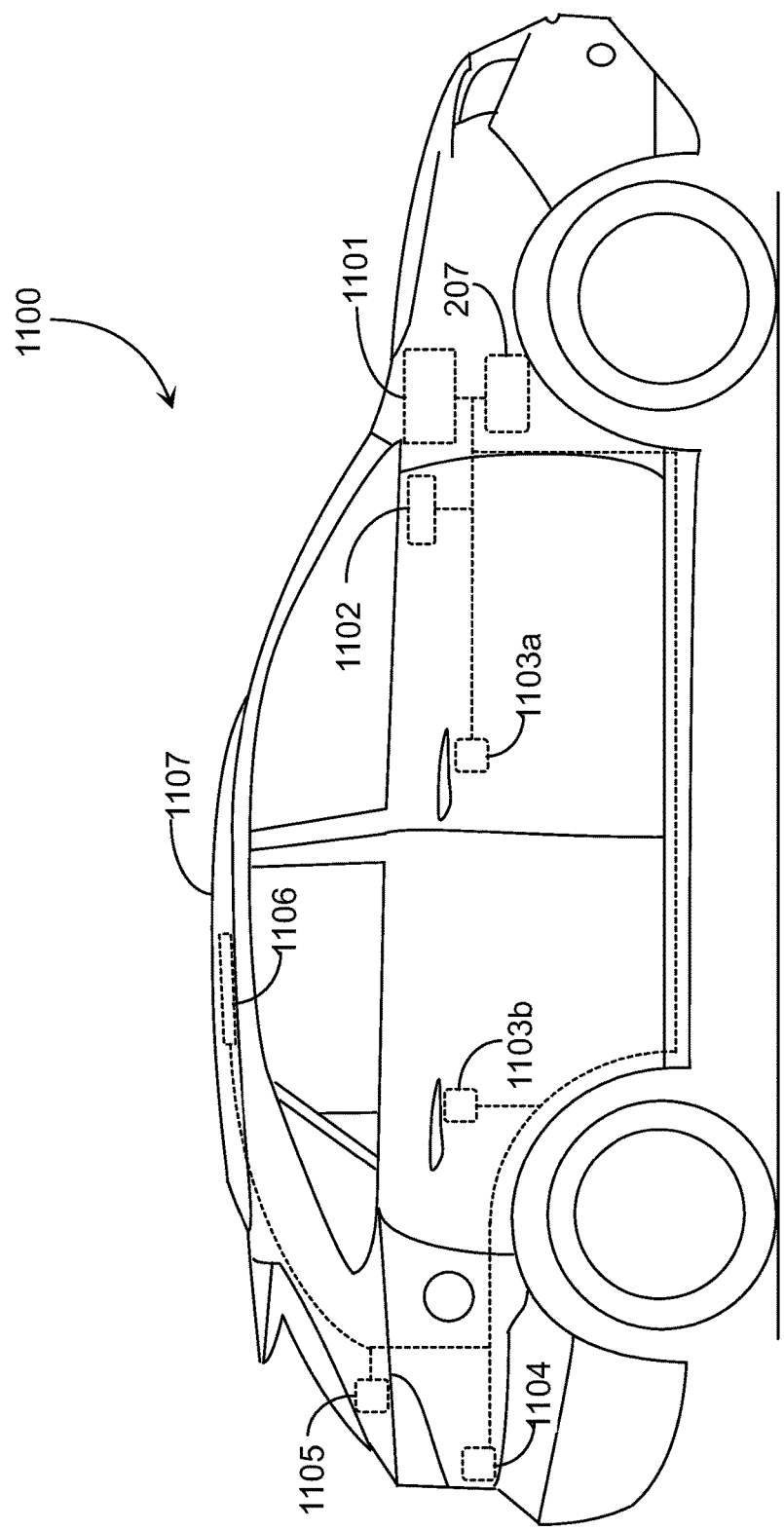
FIG. 11 is an elevation view of a vehicle equipped with safety mechanisms operated remotely that may mitigate a hazardous situation to vehicle occupants in progress before help may arrive.

FIG. 11 is an elevation view of a vehicle 1100 equipped with safety mechanisms operated remotely that may mitigate a hazardous situation to vehicle occupants in progress before help may arrive. Vehicle 1100, like vehicle 112 of FIG. 5, includes a mobile alert system having a unit such as unit 207. In this view previously depicted sensors, such as were introduced and described in FIG. 2, have been removed for clarity of illustration but may be assumed present and operating.

Vehicle 100 includes unit 207 and further includes a toggle wire connection between unit 207 and car battery 1101. Car batteries of vehicles such as vehicle 1100, which, in this example, is a sports utility vehicle (SUV) often have outlets or devices installed that may tap battery power from car battery 1100 without running the engine to charge the battery. In this implementation, one or more mechanical devices may be installed in vehicle 1100 and may have toggled or controlled access to battery power from battery 1101 whereby that access may be controlled remotely through unit 207.

Proactive mechanical devices may include devices that may be used to override stock devices such as door and trunk locks and electric motor switches that may be remotely controlled to roll down windows or to open and close sun roofs. In this implementation, a mechanical toggle device 1102 is provided to be integrated with an electric input panel that controls powered windows and perhaps a sun roof if one is available. When vehicle 1100 is not running but unit 207 is connected to a remote server, device 1102 may be caused by signal to override current window positions and may be used to roll down one or more than one vehicle window and may be used to open a sunroof.

Mechanical devices 1103*a* and 1103*b* may be provided to be integrated with door locks and may be used to override current lock state of the doors and unlock one or more doors. In a variation of this implementation mechanical devices 1103*a* and 1103*b* may also be enabled with mechanics to override a door handle and cause a door to pop open. A mechanical device 1104 is provided and is connected to a trunk latch for the purpose of remotely over-riding a closed and locked trunk, resulting in the trunk popping open as a direct result of a remote signal sent to unit 207. Mechanical device 1105 is a device similar to device 1104 that functions to override a locked and closed state of a back window panel door such that it may be remotely unlocked and opened.

A mechanical device 1106 is provided and integrated with a deployable shade device located on the roof of vehicle 1100. Shade device 1107 may include framing components and servos that may be actuated through mechanical device 1106 to cause the shade device to open and shade the roof and windows of vehicle 1100 against the sun.

In one implementation when a sensor or sensors in vehicle 1100 collect data that analysis determines there are one or more occupants in the vehicle and current conditions pose a critical condition within the vehicle, such as excessive heat for example, a remote server such as server 120 of FIG. 2 operating SW 126 may generate a signal or command to unit 207 that may cause battery powered operation of any of or a combination of the mechanical devices to proactively mitigate the situation before the owner can return or before first responders may arrive at the scene. Unlocking one or more doors and rolling down one or more windows may temporarily alleviate a dangerous heat condition and enable first responders to rescue a pet or a child without have to break windows, etc. Having a shade device deployed on a rooftop may enable up to a 30 degree reduction in heat inside the vehicle if all windows and the roof are shaded from the sun. Opening trunk lids, back doors, sun roofs, etc. may alleviate temperature and allow circulation of air.

Devices such as those depicted herein may all draw on battery power of the vehicle battery 1101. Unit 207 may, according to server command, select which of several devices to execute. Some commands may be based strictly upon temperature reading such as perhaps rolling all windows down 8 inches when the inside temperature reaches a threshold and one or more occupants in the vehicle may be at risk. The owner that left the vehicle might not be reached and first responders may be too far away to make an effective rescue. Therefore having one or more proactive devices like those depicted herein can make the difference between life and death for an occupant or occupants. Such devices may be electromechanical devices that are installed in a vehicle by the vehicle manufacturer. It is also possible that aftermarket devices may be installed by a professional mechanic.

Figure 12:
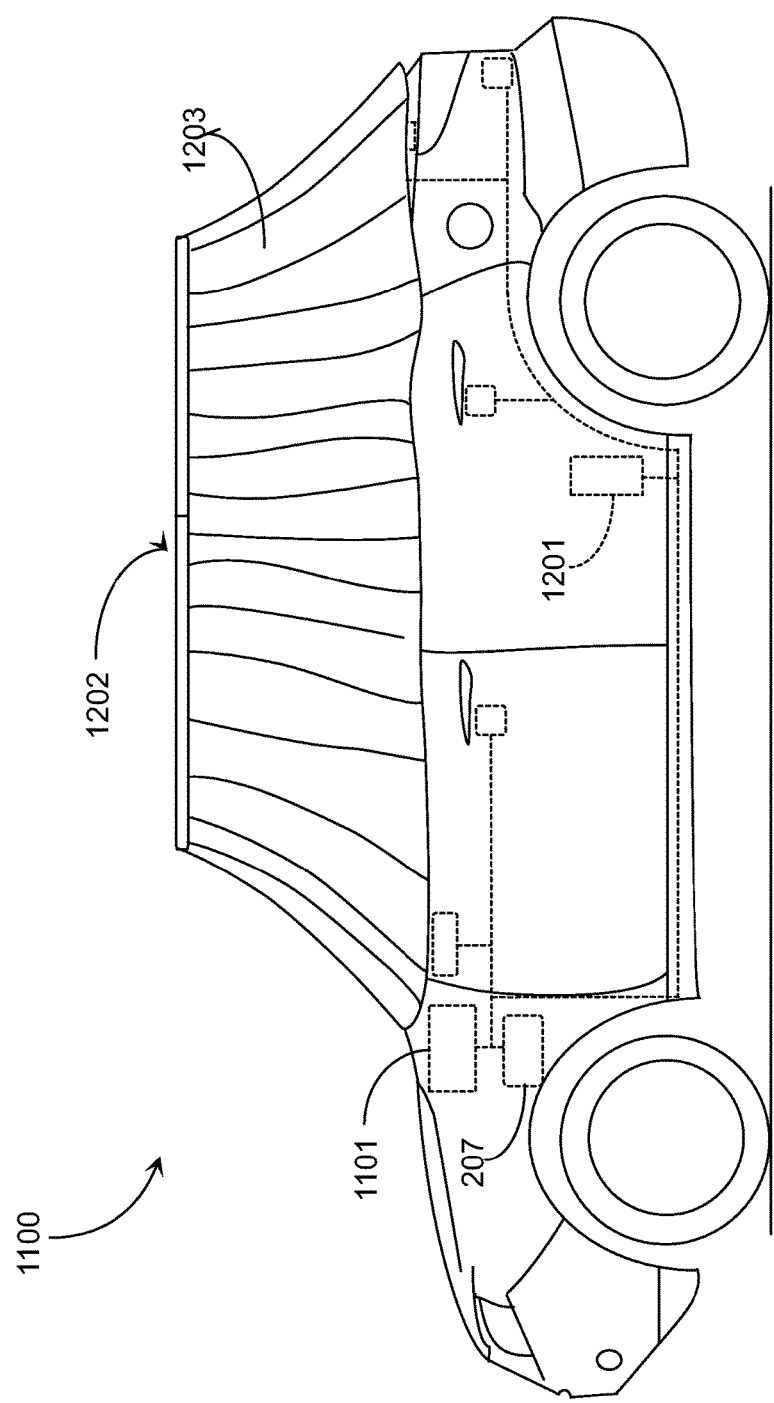
FIG. 12 is an elevation view of the vehicle of FIG. 11 depicting a deployed shade device mechanism according to an embodiment of the present invention.

FIG. 12 is an elevation view of the vehicle 1100 of FIG. 11 depicting a deployed shade device mechanism among other implements according to an embodiment of the present invention. Vehicle 1100 includes a deployed shade device 1202 that represents a deployed version of device 1107 of FIG. 11. Shade device 1202 may be a framed device that articulates under battery power in a fashion similar to an electric convertible top. In this implementation the sides of the device are fabric panels 1203 that drop down once the frame has articulated over the roof of the vehicle. It will be apparent to one with skill in the art that other frame and articulation designs may be possible and considered without departing from the spirit and scope of the present invention.

Also in this embodiment, a heating and or cooling system that may be powered solely by the vehicle battery may be installed within vehicle 1100 such as implement 1201. Implement 1201 may be a radiative heater using electrically heated oil as a conduit in order to remain safe for use inside a closed vehicle. Radiative heating may be toggled on by unit 207 is the same fashion described for other mechanical devices introduced in FIG. 11. For example, if the driver has left one or more occupants in the vehicle and cannot be reached when sensors trigger a critical temperature drop, the server may toggle on radiative heater 1201 to provide enough heat to prevent the occupants from suffering before the owner or first responders make it to the vehicle.

In another embodiment, unit 1201 may be a compact cooling system such as an air conditioner having access to outside air and the mechanics and coolant to function to cool the inside of the vehicle without the vehicle running. It may enable cooling and inflow of air into the vehicle at least temporarily defined by the life of the vehicle battery. In this way occupants may be prevented from overheating or becoming critically compromised within the time it may take to respond to the situation via the owner/driver or via first responders.

In various embodiments of the invention a safety alert system for a specific vehicle operates with an Internet-connected server executing software from a non-transitory medium, which is coupled to a digital data repository. The data repository in some embodiments stores a profile identifying the vehicle and one or more persons associated with the vehicle, such as an owner or a driver of the vehicle, and may also store contact information for the one or more persons. Within the vehicle there may be a monitoring apparatus having circuitry executing coded instructions, and a two-way Internet connection to the Internet-connected server. There may, in addition, be GPS circuitry coupled to the monitoring apparatus, which in turn, may be coupled to a plurality of sensors, sensing both environmental conditions and status of apparatus of the specific vehicle, and reporting said conditions and status to the monitoring apparatus as variable values. Sets of variable values may be stored in the profile, indicating an alert status to be assumed.

The Internet-connected server keeps a running chronological log of reported variable values for the specific vehicle, periodically compares the variable values reported with the at least one set of variable values indicating an alert status, and issues an alert accordingly. When the Internet-connected server finds a match of reported variable values with a set of variable values indicating an alert status, the server generates a message to a communication device registered to a person for whom contact information is stored.

In some cases, the communication device to which the Internet connected server generates a message may be a mobile smart telephone registered to a person, and the mobile smart telephone, in response to a message, may execute an alert application that displays a visual alert on a display of the mobile smart telephone or generates an audible alert by a speaker of the mobile smart telephone. In some circumstances there may be several people having contact information in the profile, and the Internet-connected server is enabled to generate messages to communication devices registered to individual ones of the plurality of persons. The profile may also comprise a plurality of sets of variable values, each indicating a different alert status.

In some cases, the alert application operating on the smart telephone may display a requirement for the person to respond to the alert, back to the Internet-connected server, within a certain time duration. If the person does not respond in the time frame, the Internet-connected server, executing the software, may escalate to a new alert status, and may generate one or more messages to alternative persons or enterprises, the messages indicating an emergency status, and providing GPS location of the vehicle.

In some cases, when an alert is issued, the Internet-connected server searches for contact information for persons or enterprises in a pre-programmed radius of the GPS location of the vehicle, and generates emergency messages to one or more of the persons or enterprises, providing the GPS location of the vehicle, and requesting emergency intervention. This process in some circumstances might go so far as to try to find phone numbers of businesses or private individuals who happen to be within a close radius of where the vehicle is known to be, by GPS coordinates.

In some embodiments, the software system at the Internet-connected server, using the two-way link to the monitoring apparatus in the vehicle, may cause certain actions to take place in the vehicle, such as managing electro-mechanical devices, like windows, door locks trunk lock and more.

A very important variable in operation of the system of the invention, in various embodiments, is determination of presence of a life form, in particular a human being, which may in different circumstances be a child or perhaps a physically-impaired adult. There is small point in going to great lengths to alert owners and drivers who may have left the vehicle, unless there is a compelling reason to do so. Accordingly, among the sensors that may be connected to, and may report to, the monitoring apparatus, may be sensors like, for example a CO2 sensor that can measure higher than normal presence of CO2 in the atmosphere in the vehicle, which would be an indication of breathing by a human or a pet. Other sensors may include motion sensors that trigger on movement, image-capturing devices, like still and video cameras, and the like. Pressure sensors in seats and seat backs may be used to sense if a person or a pet occupies a seat. In some embodiments such life-form-sensing sensors may be located in a trunk of a passenger vehicle.

In some embodiments, sensing a person or a pet in a vehicle may cause the system to initiate a voice communication subsystem, including a microphone and a speaker, to possibly open communication with the person in the vehicle.

In some embodiments of the system, the sensors may be selectively monitored, and compared with combinations of variable values that will indicate an attempt to tamper with or improperly enter the vehicle, so the system can serve as a security system, and initiate alerts accordingly, as well.

In some aspects of the invention an ability is provided for the system to interact with public Silver Alert and Amber Alert functions. As is well-know, these alerts are broadcast in situations of, for example, kidnapping of children. Functionality, typically executing on a cellular telephone, provides an audio or visual alert, or both, in response to receiving an Alert. Referring now to FIG. 1, module 118 is described as having a processor, and of executing software 115. In some embodiments module 118 communicates with server 120 via wireless mobile network 102, and may also receive wireless calls, including Amber and Silver Alert calls. SW 115 may also include executable code for performing certain functions in response to an Amber or Silver Alert call. This telephone functionality may also include texting functionality.

In one embodiment module 118 is registered with server 120, by stored data such as vehicle identification number, license number, make and model of vehicle, registered owner, and so on. In one embodiment, upon receiving a Silver or an Amber alert call, system 118 connects to server 120, or recalls data from a local repository, and determines if the vehicle hosting module 118 is a vehicle that is subject of the Amber alert or Silver Alert.

In the event that the host vehicle is, in fact, the subject of the Amber or Silver Alert, module 118 will alert server 120, which will determine the exact location of the vehicle, and alert first responders, such as law enforcement functionaries, who will take necessary action. In one embodiment responders will know, or will be informed of, a code sequence, that may be communicated to the vehicle rom server 120, which will disable the vehicle at a time determined by the responder(s).

In certain embodiments, vehicle functions, such as unlocking doors, the vehicle trunk, turning on-off an air conditioner, and other functions, may be accomplished from outside the vehicle, by such as first responders, by interaction with server 120, which then interacts with module 118 through the network connectivity. The interaction by a first responder with server 120 may be accomplished in different embodiments in different ways, such as by texting, voice communication, or Internet access through a browser or mobile application, with a user interface or dashboard provided by server 120. A data-encoded text message sent to module 120 may be recognized by SW 115 to accomplish the functions.

In one embodiment of the system, in event of sensor damage or malfunction, which may be caused, for example, by an accident or vandalism, SW 115 encodes functionality to alert server 120 of sensor viability, which information may be forwarded to responsible parties, such a vehicle owner, first responders, and others, as programmed, and functionality is provided for resetting the system as sensors are repaired, replaced and retested.

In one embodiment, after the system determines that there is no living entity inside the vehicle, the system remains active until the vehicle is turned back on. During this time the system changes to the above-described security protocol, and monitors for breach of doors, window, trunk lid, hood, and so on. When a living entity is detected in the vehicle, the mode reverts to the alert mode from the security mode.

Among functions that may be implemented under various circumstances. and at risk of redundancy over other description above, windows may be rolled down to preprogrammed extent, the vehicle's engine may be started or stopped, an airway into the trunk from inside the vehicle may be opened in response to a sensor indicating a living entity in the trunk, the air conditioner and heater may be turned on and off, microphones and speakers in the vehicle and in the trunk may be activated and deactivated, and still and video cameras may be activated, deactivated, focused, and viewpoints adjusted.

It will be apparent to one with skill in the art that the mobile alert system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A safety alert system for a specific vehicle, comprising:
an Internet-connected server executing software from a non-transitory medium;
a digital data repository coupled to the Internet-connected server;
a profile associated with the specific vehicle and stored in the digital data repository, the profile identifying the specific vehicle and comprising contact information for a person;
a computerized monitoring apparatus located in the specific vehicle, the apparatus having circuitry executing coded instructions, and a two-way Internet connection to the Internet-connected server;
global positioning system (GPS) circuitry coupled to the monitoring apparatus;
a plurality of sensors coupled to the monitoring apparatus, sensing both environmental conditions as specific instant values and status of apparatus of the specific vehicle, and reporting said conditions and status to the monitoring apparatus as variable values; and
at least one set of variable values stored in the digital data repository indicating an alert status;
wherein the monitoring apparatus periodically reports the specific instant values and status for the plurality of sensors to the Internet-connected server as a timed-stamped set of values and status, the Internet-connected server stores each set in the profile for the vehicle, and compares each incoming set with the at least one set of variable values indicating an alert status, and issues an alert accordingly, the alert also time-stamped and stored in the profile for the vehicle.

2. The safety alert system of claim 1, wherein the Internet-connected server, upon finding a match of reported variable values with a set of variable values indicating an alert status, generates a message to a communication device registered to the person for whom contact information is stored.

3. The safety alert system of claim 2, wherein the communication device to which the Internet connected server generates a message is a mobile smart telephone registered to the person, and the mobile smart telephone, in response to the message, executes an alert application that displays a visual alert on a display of the mobile smart telephone or generates an audible alert by a speaker of the mobile smart telephone.

4. The safety alert system of claim 1, wherein contact information for a plurality of persons are a part of the profile, and the Internet-connected server is enabled to generate messages to communication devices registered to individual ones of the plurality of persons.

5. The safety alert system of claim 1, wherein the profile comprises a plurality of sets of variable values, each indicating a different alert status.

6. The safety alert system of claim 3, wherein the alert application displays a requirement for the person to respond to the alert, back to the Internet-connected server, within a certain time duration.

7. The safety alert system of claim 6, wherein, upon failure of the person to respond within the time duration, the Internet-connected server, executing the software, escalates to a new alert status, and generates one or more messages to alternative persons or enterprises, the messages indicating an emergency status, and providing GPS location of the vehicle.

8. The safety alert system of claim 7, wherein the Internet-connected server searches for contact information for persons or enterprises in a pre-programmed radius of the GPS location of the vehicle, and generates emergency messages to one or more of the persons or enterprises, providing the GPS location of the vehicle, and requesting emergency intervention.

9. The safety alert system of claim 1, further comprising connection of the computerized monitoring apparatus to vehicle circuitry in a manner that the monitoring apparatus is enabled to initiate and manage operation of mechanical devices of the vehicle, and wherein, upon an alert being issued, signals are provided by the by the Internet-connected server to the monitoring apparatus, initiating operation of one or more of the mechanical devices.

10. The safety alert system of claim 9, wherein the monitoring apparatus, in response to signals from the Internet-connected server, opens one or more windows of the vehicle to a pre-programmed degree.

11. The safety alert system of claim 9, wherein the monitoring apparatus, in response to signals from the Internet-connected server, causes a horn of the vehicle to operate in a pre-programmed pattern.

12. The safety alert system of claim 9, wherein the monitoring apparats, in response to signals from the Internet-connected server, unlocks one or more doors of the vehicle.

13. The safety alert system of claim 1, wherein the plurality of sensors includes one or more sensors providing indication of a life form in the vehicle, and wherein the Internet-connected server makes a determination of presence of a life form as a part of a process to determine alert status, and to issue alerts.

14. The safety alert system of claim 13, wherein the one or more sensors providing indication of a life form in the vehicle, comprise one or more pressure sensors in seats of the vehicle.

15. The safety alert system of claim 13, wherein the one or more sensors providing indication of a life form in the vehicle, comprise one or more sensors monitoring concentration of one or more gases in the atmosphere in the vehicle.

16. The safety alert system of claim 13, wherein the one or more sensors providing indication of a life form in the vehicle, comprise one or more image devices transmitting image data to the monitoring apparatus, thence to the Internet-connected server.

17. The safety alert system of claim 13, wherein the one or more sensors providing indication of a life form in the vehicle, are focused on a trunk region of the vehicle, and wherein, in response to determining a life form in the trunk region, the Internet-connected server unlocks and opens the trunk.

18. The safety alert system of claim 13, wherein, in response to determining a life form in the vehicle, the Internet-connected server initiates operation of a microphone and a speaker in the vehicle, enabling voice communication between the Internet-connected server and the life form in the vehicle.

19. The safety alert system of 1 wherein the monitoring apparatus is focused on sensors that indicate tampering with the vehicle from outside, and the alert statuses and alerts are programmed to serve as a security system.

\* \* \* \* \*